(12) United States Patent
Shin et al.

(10) Patent No.: US 12,532,985 B2
(45) Date of Patent: Jan. 27, 2026

(54) CONTROL FOR INTELLIGENT COOKING DEVICE

(71) Applicant: LG ELECTRONICS INC., Seoul (KR)

(72) Inventors: Wonho Shin, Seoul (KR); Jichan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 774 days.

(21) Appl. No.: 17/801,189

(22) PCT Filed: May 29, 2020

(86) PCT No.: PCT/KR2020/006986
§ 371 (c)(1),
(2) Date: Aug. 19, 2022

(87) PCT Pub. No.: WO2021/167171
PCT Pub. Date: Aug. 26, 2021

(65) Prior Publication Data
US 2023/0108444 A1  Apr. 6, 2023

(30) Foreign Application Priority Data

Feb. 21, 2020  (KR) .................. 10-2020-0021447

(51) Int. Cl.
*A47J 36/32* (2006.01)
(52) U.S. Cl.
CPC .................. *A47J 36/321* (2018.08)

(58) Field of Classification Search
CPC ............ A47J 36/321; A47J 36/32; G06N 3/08
See application file for complete search history.

(56) References Cited

U.S. PATENT DOCUMENTS

| | | | |
|---|---|---|---|
| 9,516,968 B2 | 12/2016 | Hill | |
| 2016/0054778 A1* | 2/2016 | Shin | G06F 1/3206 713/323 |
| 2017/0238751 A1 | 8/2017 | Vengroff | |
| 2018/0292092 A1* | 10/2018 | Bhogal | F24C 7/085 |

(Continued)

FOREIGN PATENT DOCUMENTS

| | | | | |
|---|---|---|---|---|
| KR | 1020170034565 A | | 3/2017 | |
| KR | 20190096851 A | * | 8/2019 | G06F 18/214 |

(Continued)

*Primary Examiner* — Thien S Tran
(74) *Attorney, Agent, or Firm* — Bryan Cave Leighton Paisner

(57) ABSTRACT

A control of an intelligent cooking device is disclosed. A method of controlling an intelligent cooking device comprises obtaining sensing information related to a cooking state of contents positioned inside a heating target during performing a first control operation, checking the cooking state of the contents based on the sensing information, and generating, based on the cooking state and a usage history, control information on a second control operation to be performed after an end of the first control operation. An AI cooking device and an external terminal can be associated with an artificial intelligence module, an unmanned aerial vehicle (UAV), a robot, an augmented reality (AR) device, a virtual reality (VR) device, devices related to 5G services, and the like.

19 Claims, 19 Drawing Sheets

(56) References Cited

U.S. PATENT DOCUMENTS

2021/0030200 A1\* 2/2021 Chung ................ A47J 36/321
2021/0186260 A1\* 6/2021 Bhogal ................ A47J 36/321

FOREIGN PATENT DOCUMENTS

| KR | 1020190096851 A | 8/2019 | | |
|---|---|---|---|---|
| KR | 1020190125129 A | 11/2019 | | |
| WO | WO-2017033406 A1 | \* | 3/2017 | .............. F24C 7/083 |

\* cited by examiner

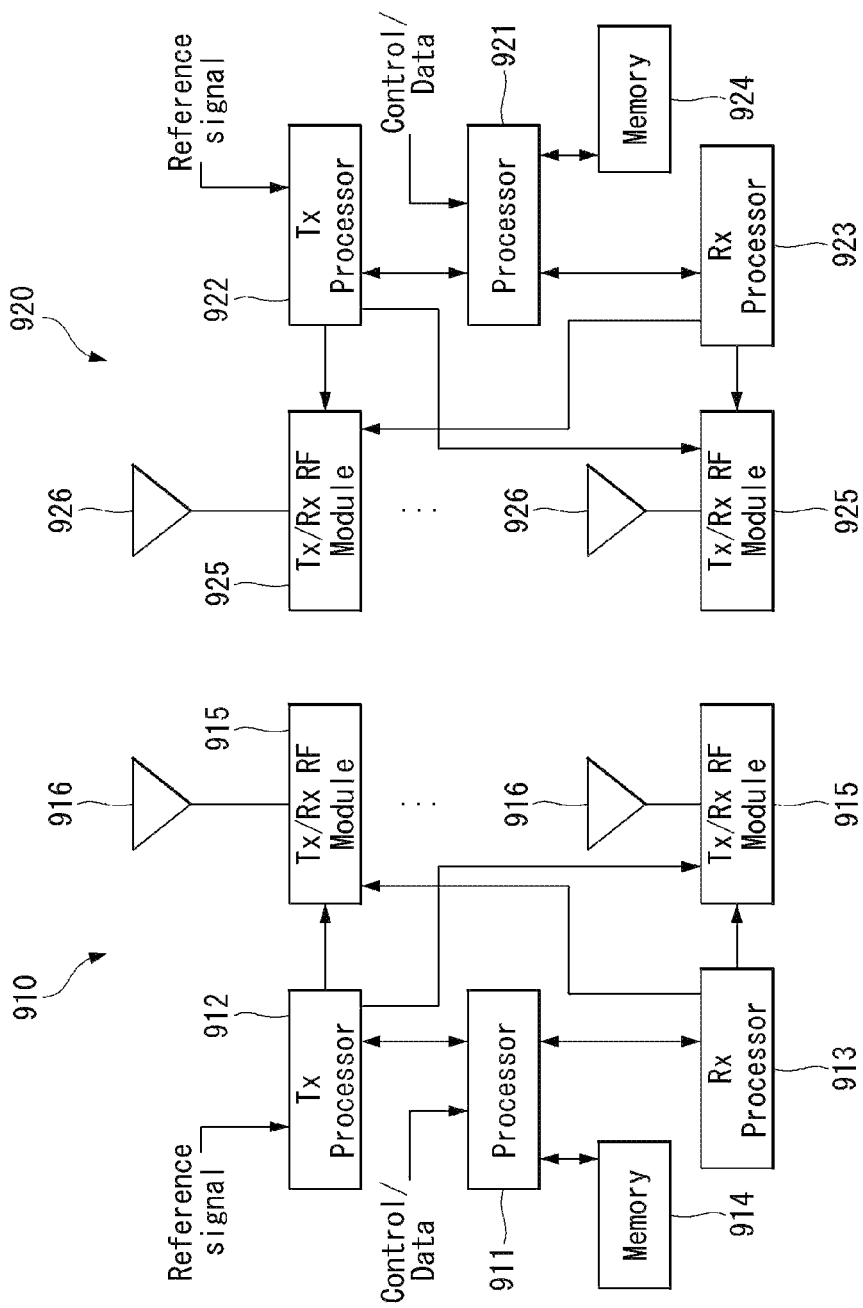
[FIG. 1]

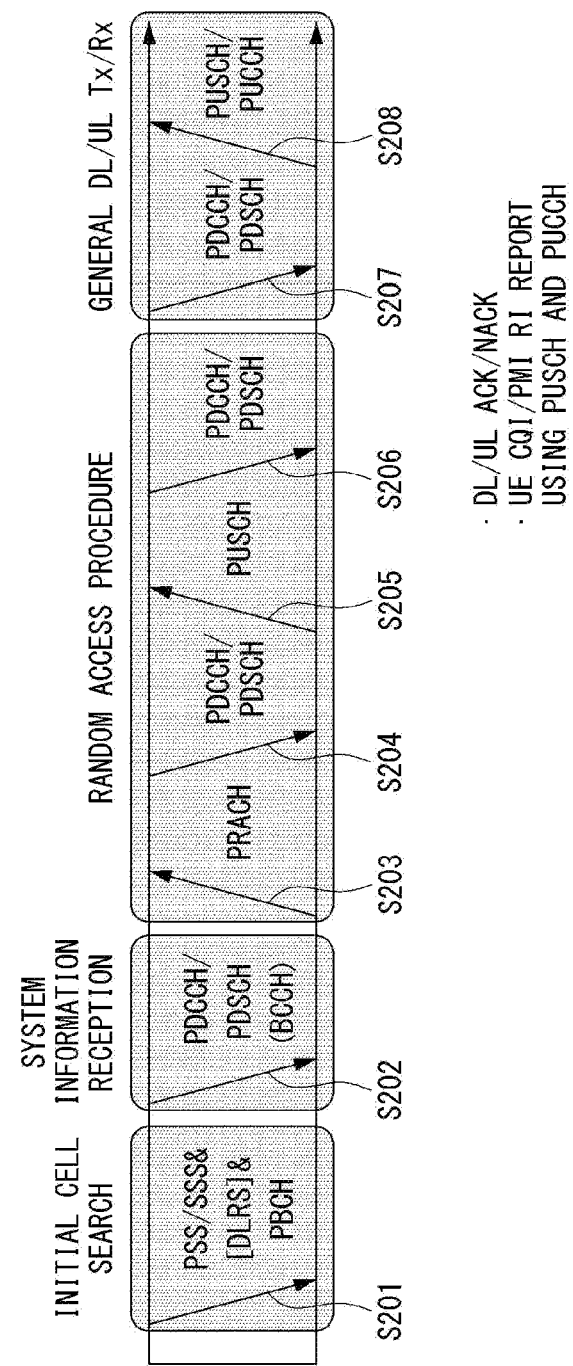

[FIG. 3]
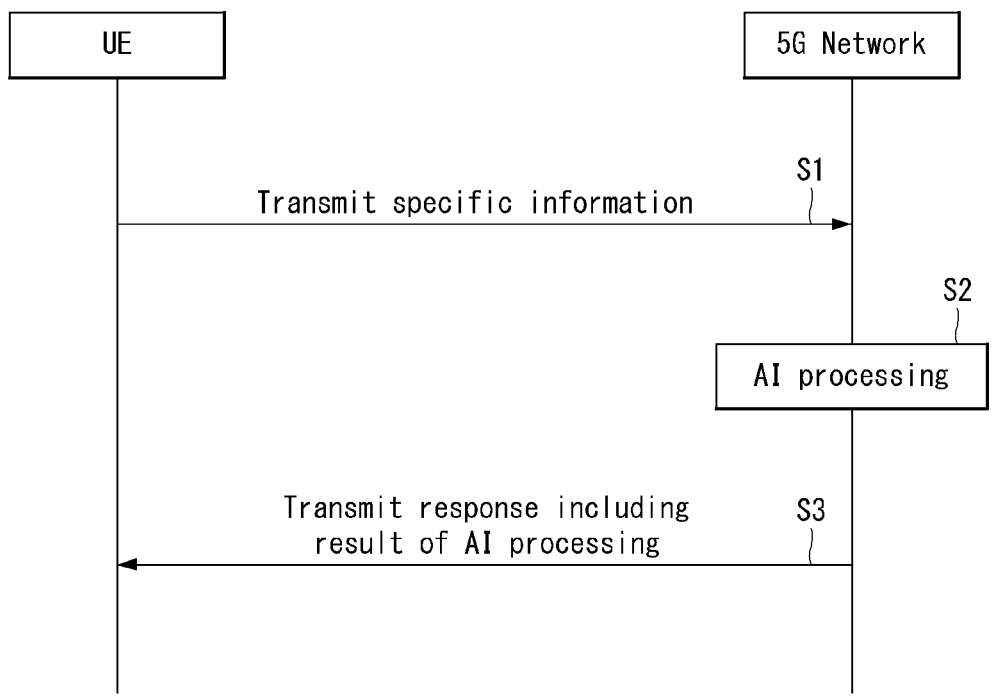

[FIG. 4]
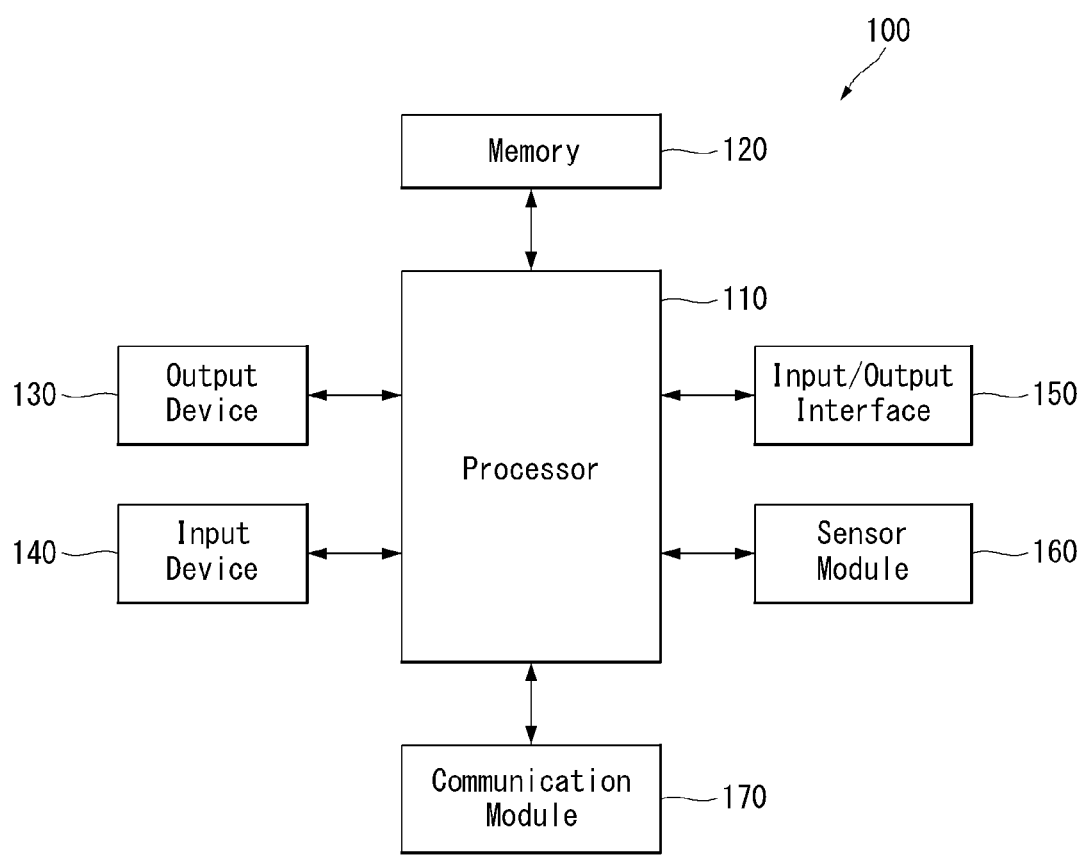

[FIG. 5]
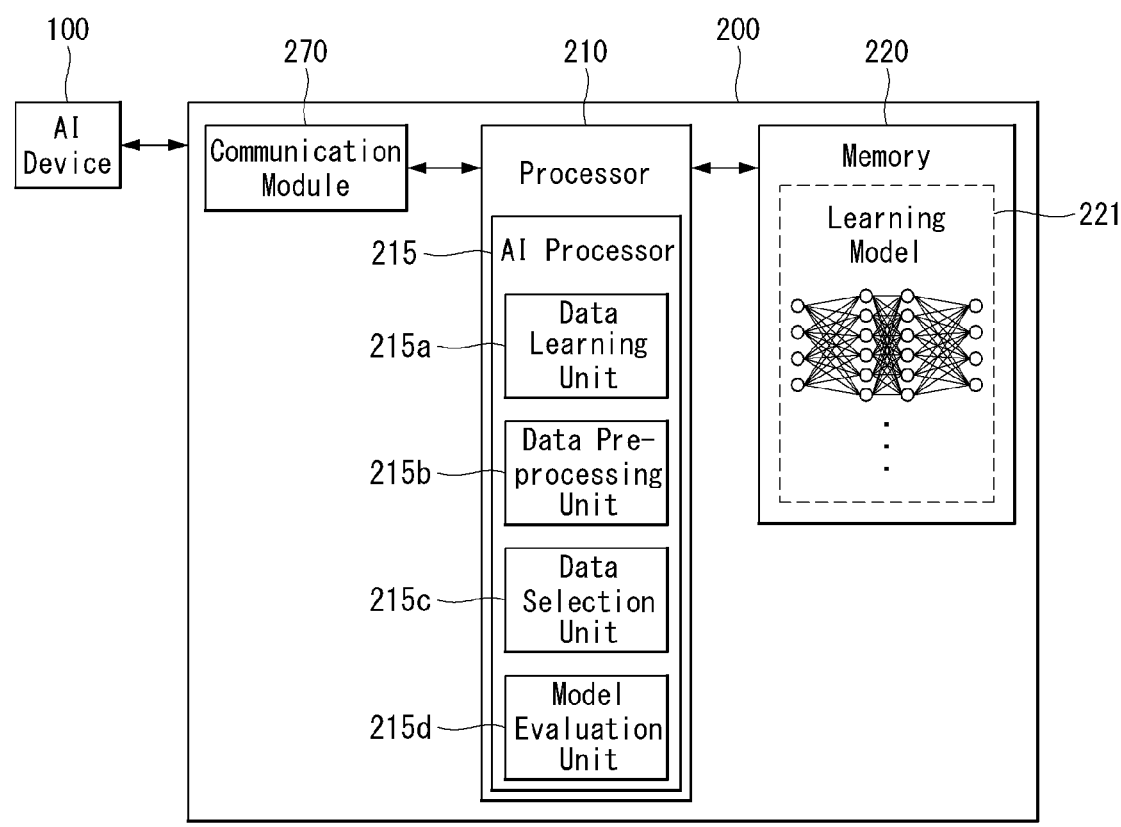

[FIG. 6]
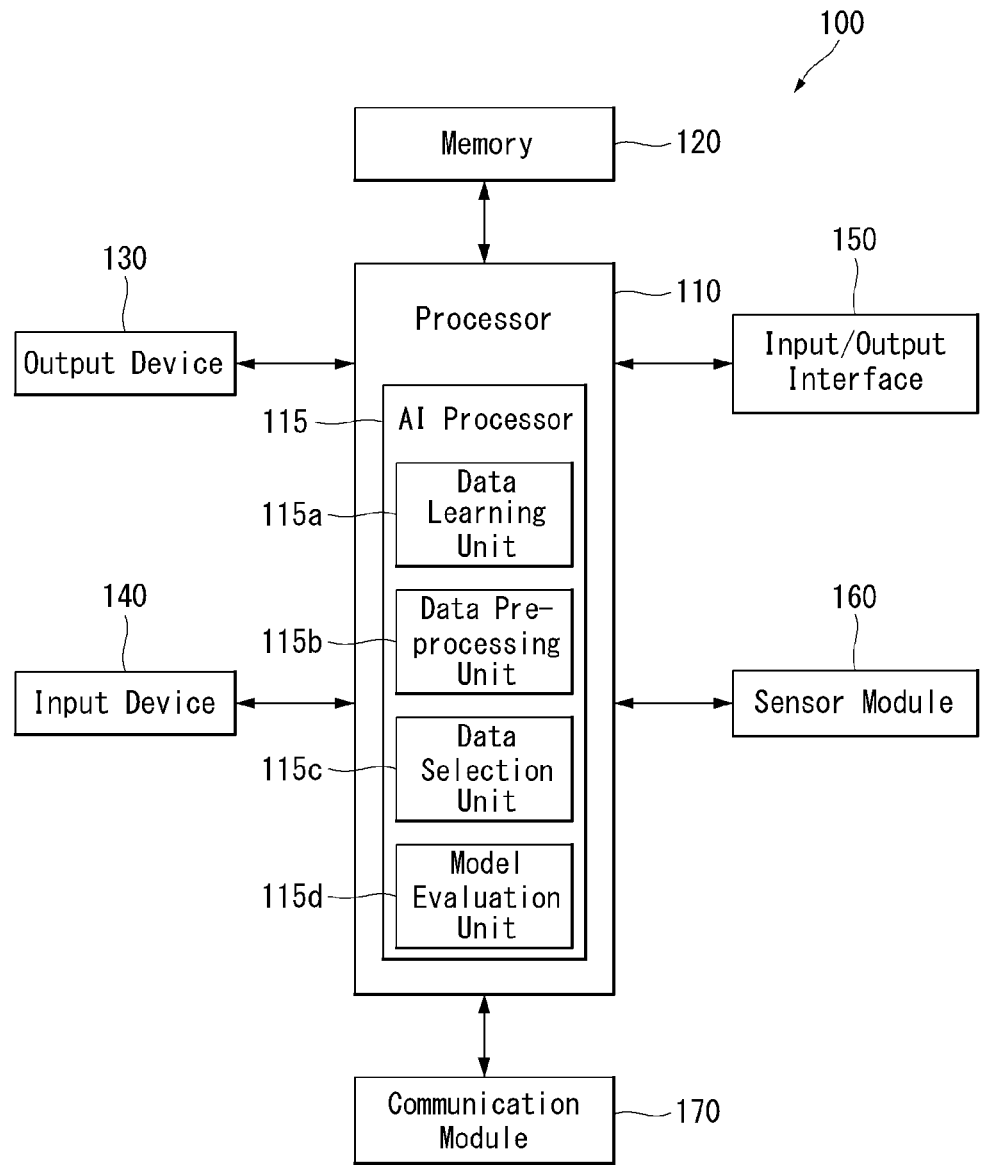

[FIG. 7]
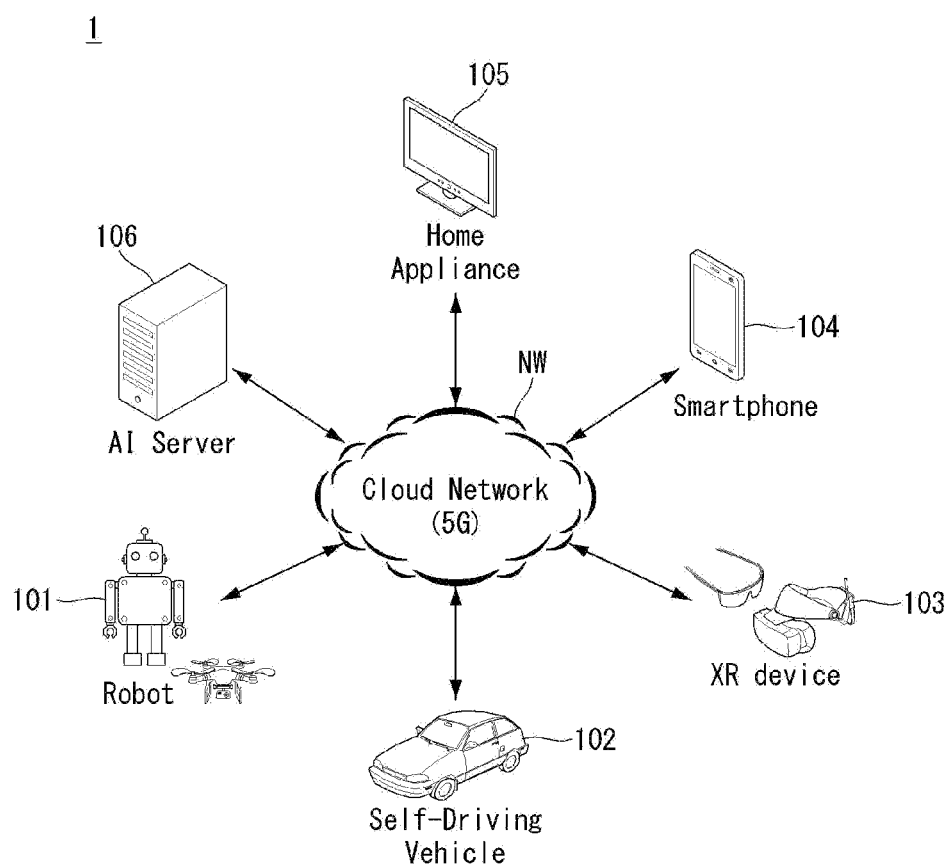

[FIG. 8]
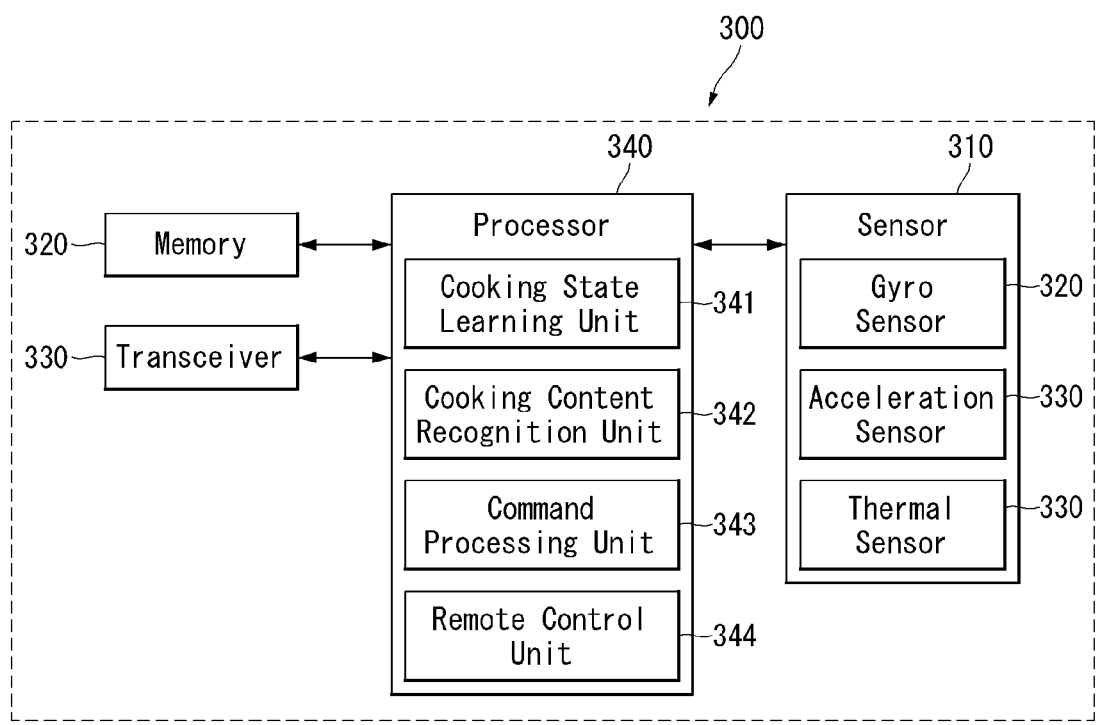

【FIG. 9】
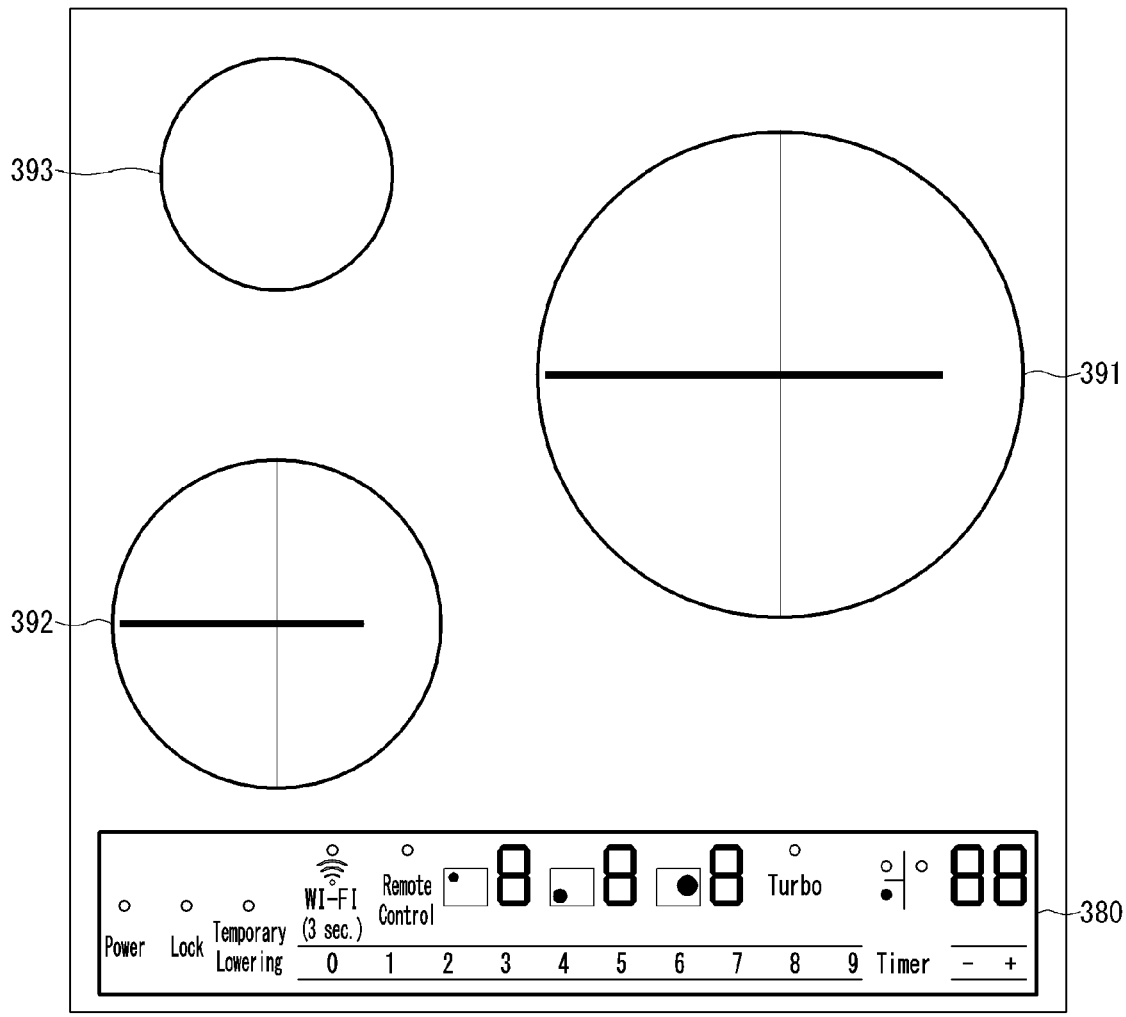
【FIG. 10】
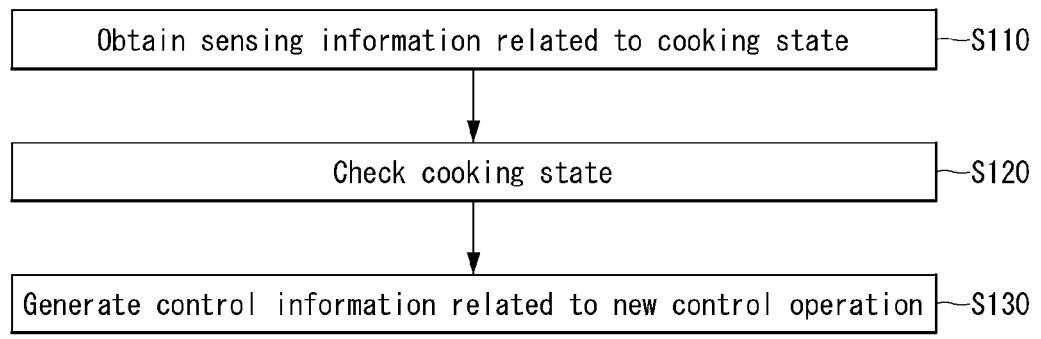

[FIG. 11]
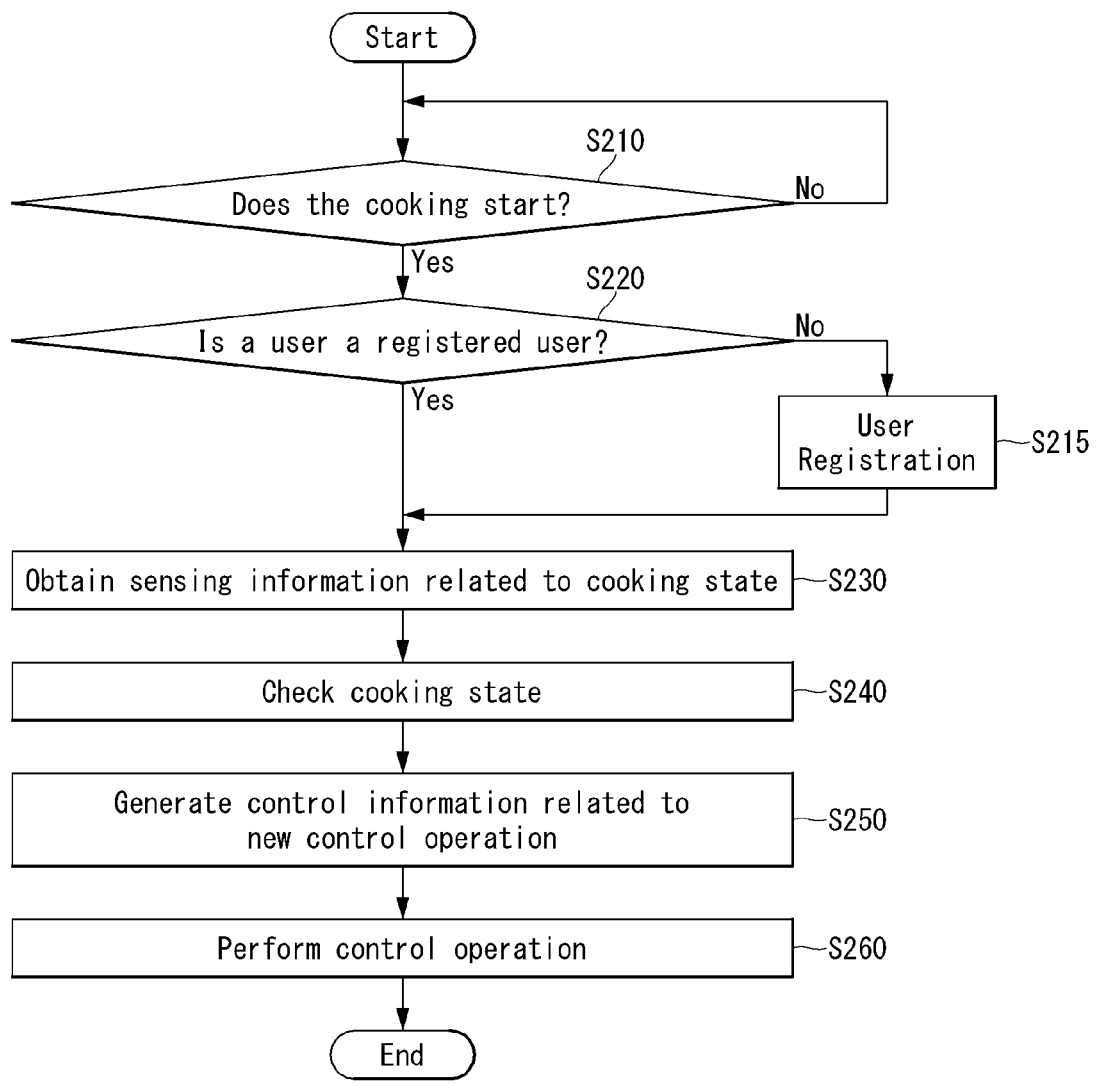

[FIG. 12]
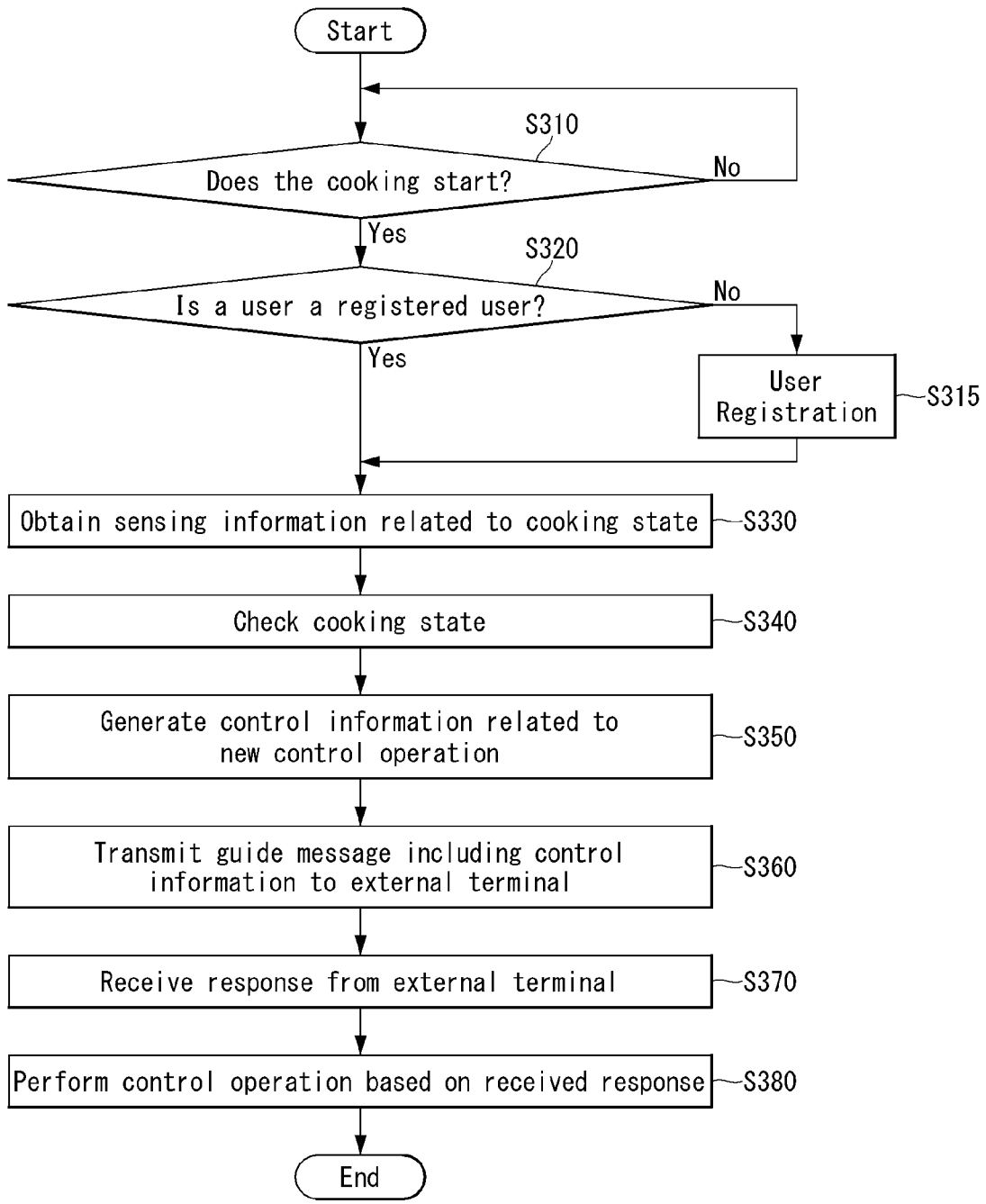

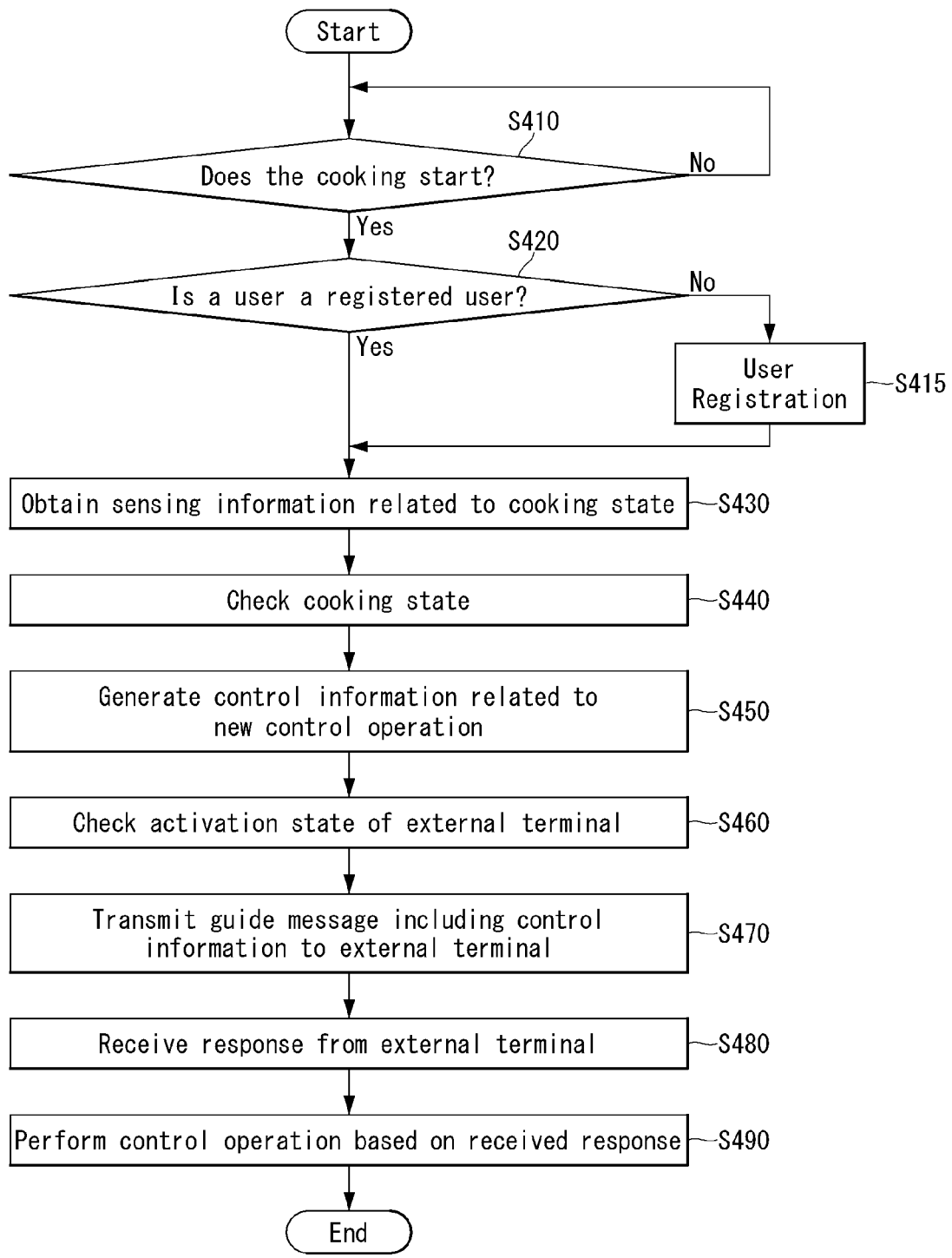
[FIG. 13]

[FIG. 14]
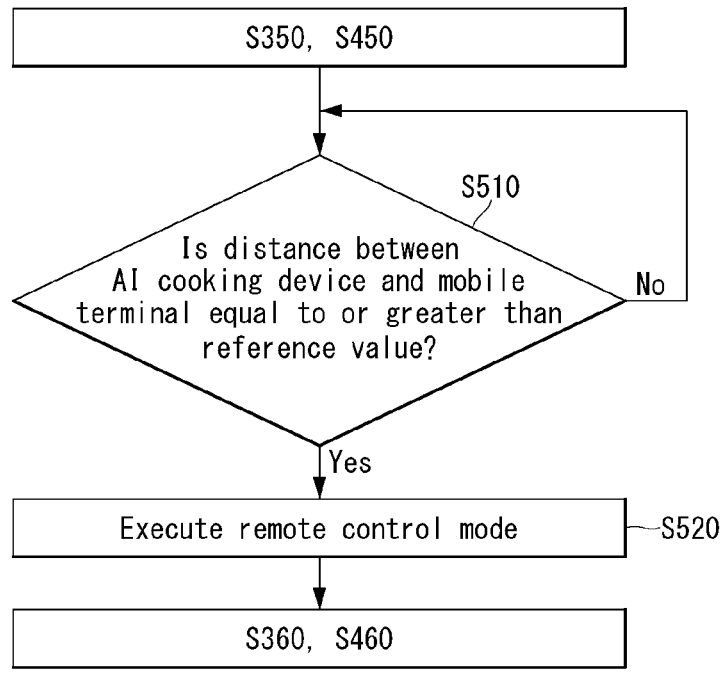
[FIG. 15]
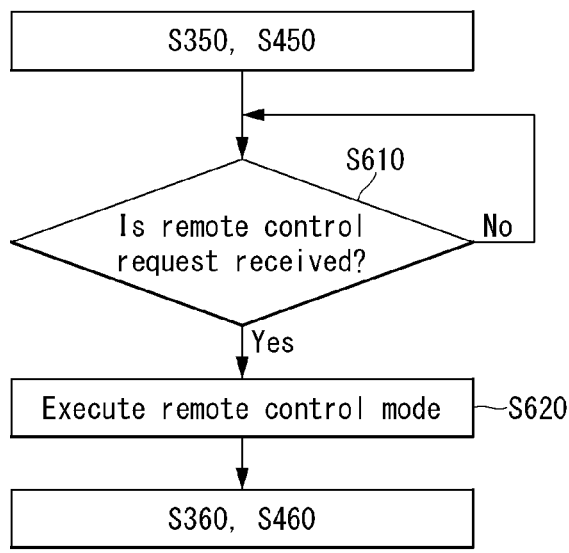

【FIG. 16】
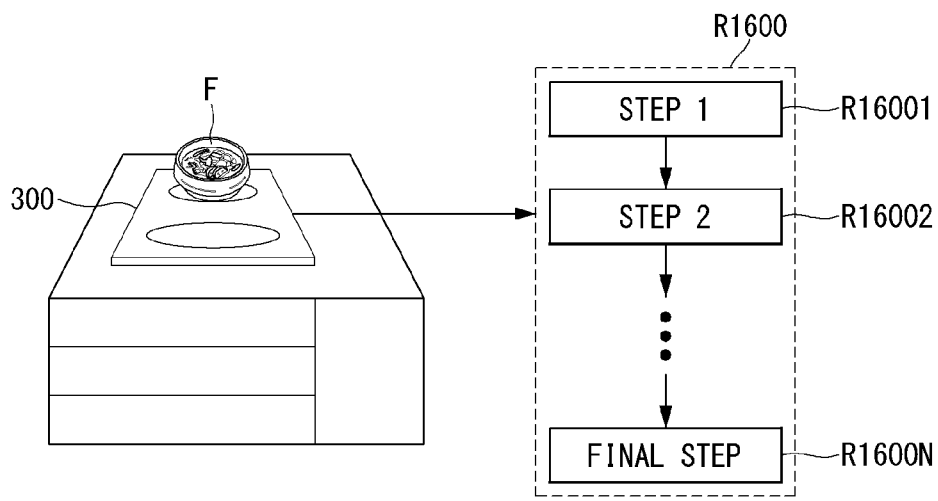
【FIG. 17】
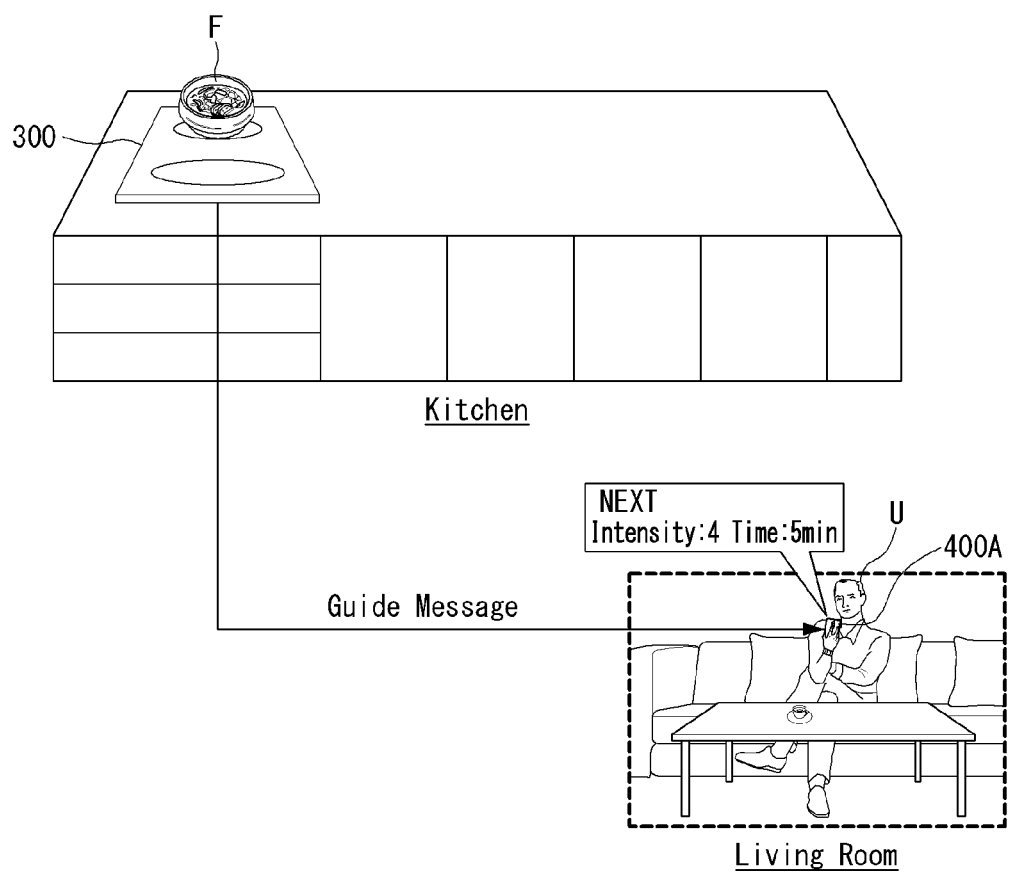

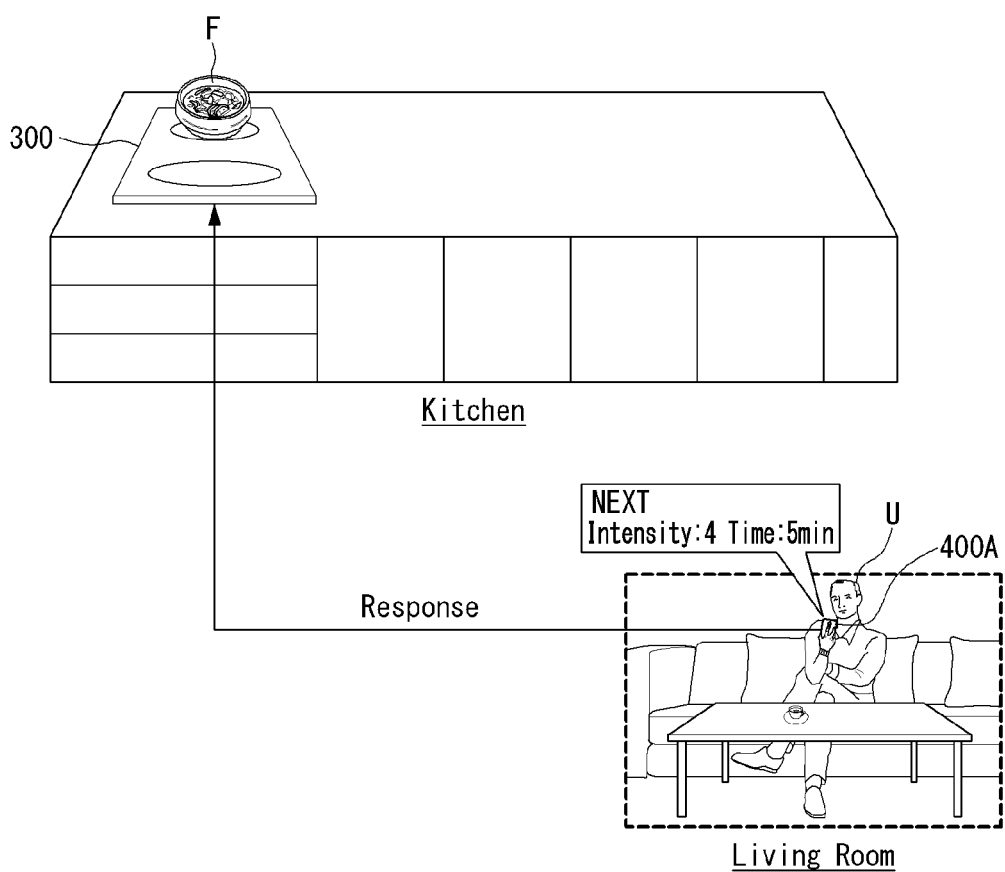
[FIG. 18]

[FIG. 19]
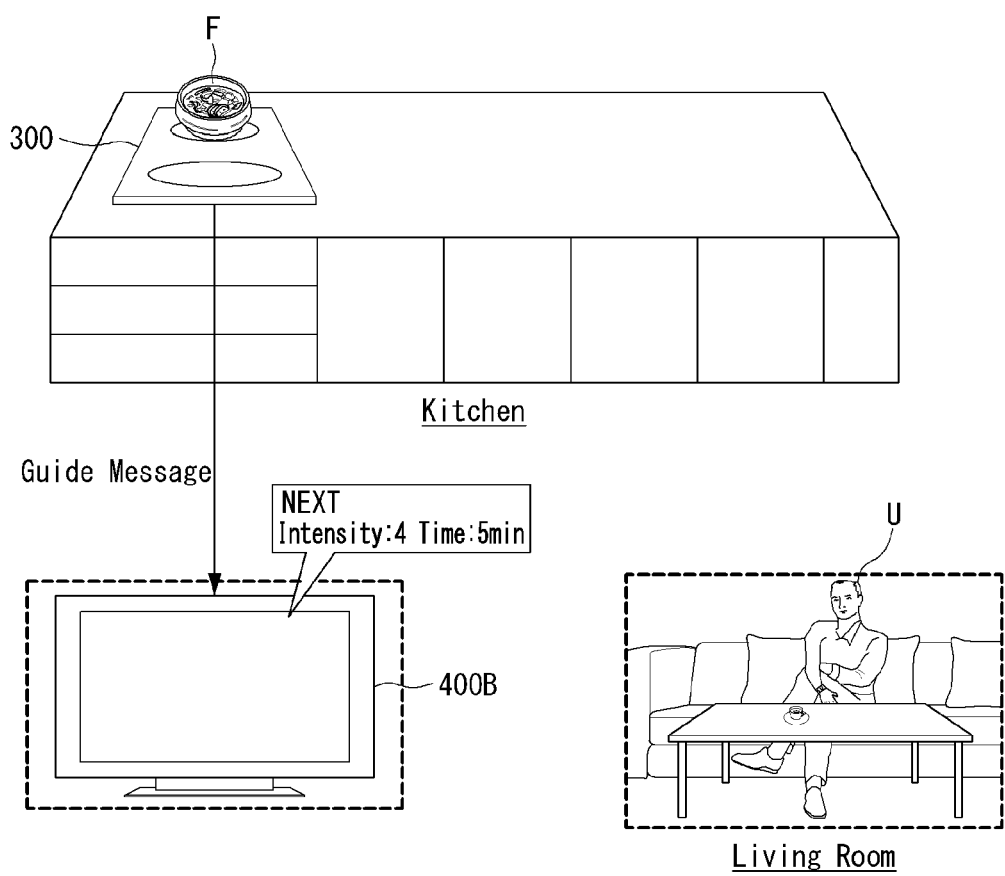

【FIG. 20】
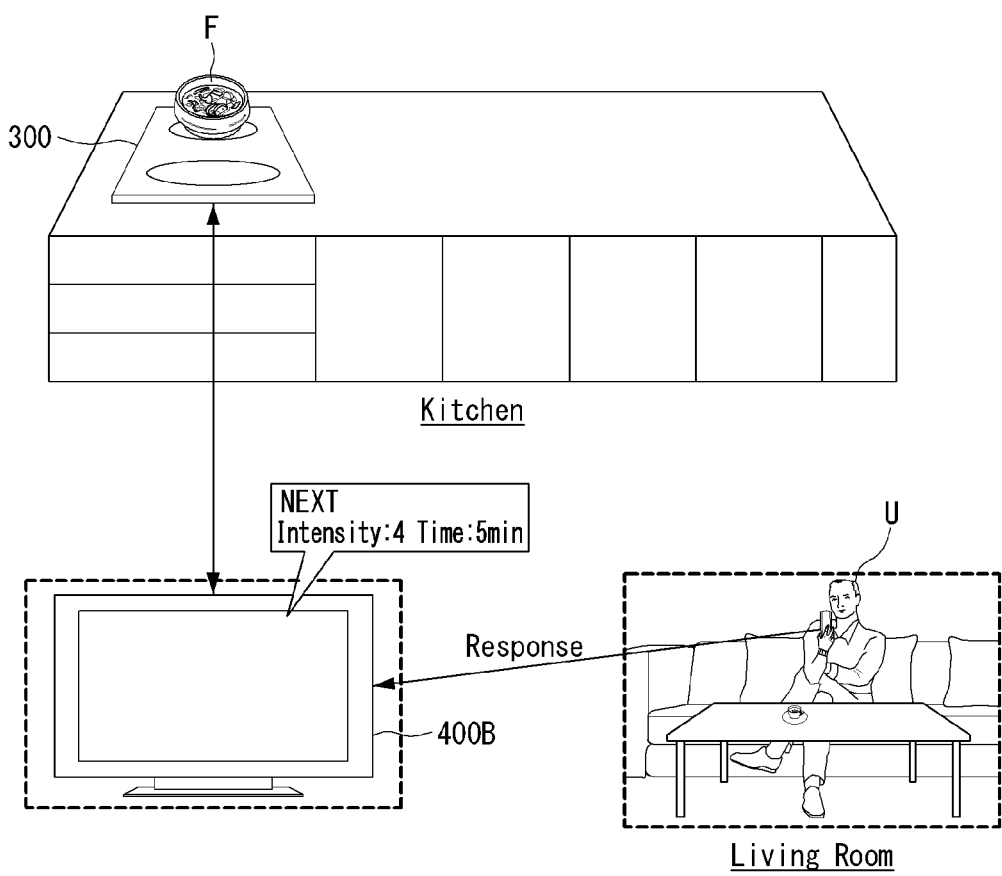

[FIG. 21]
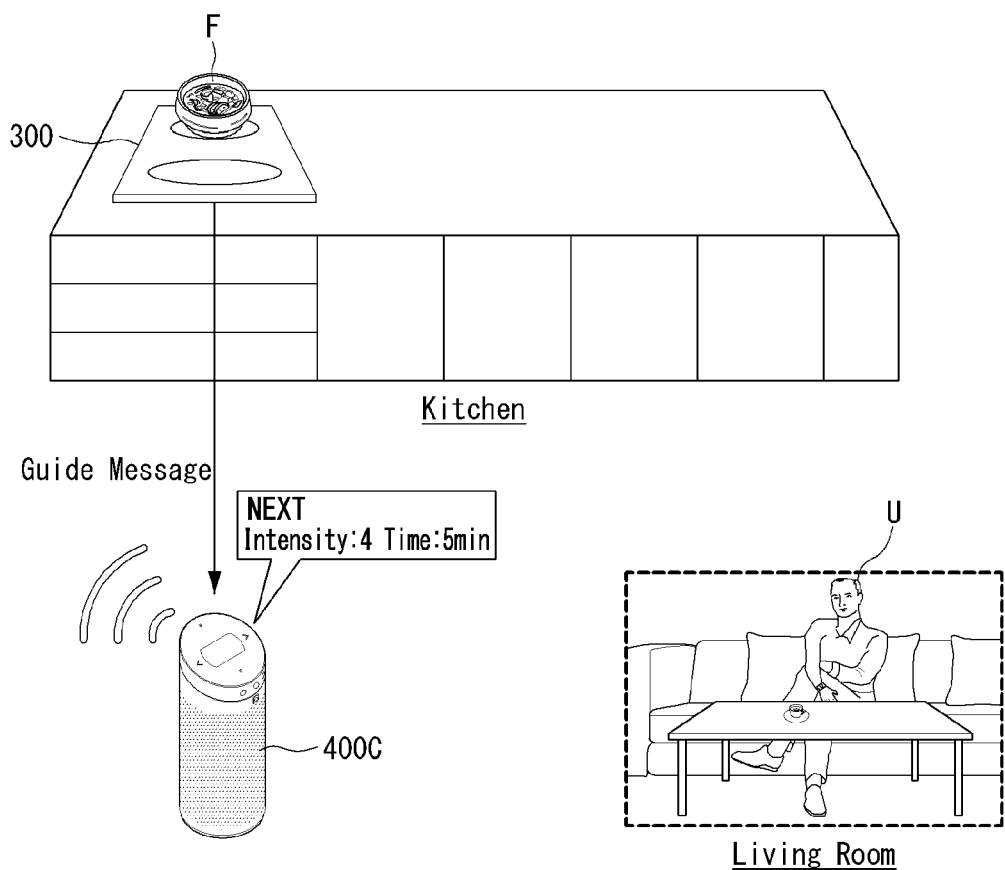

[FIG. 22]
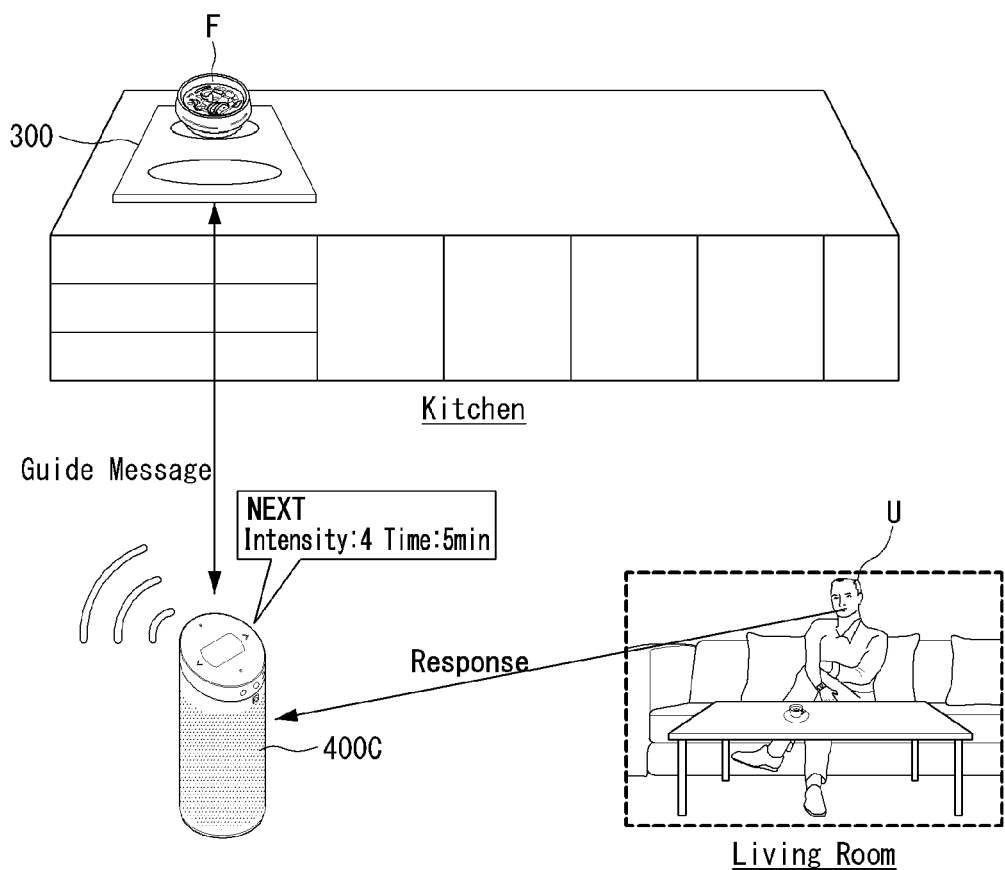

CONTROL FOR INTELLIGENT COOKING DEVICE

This application is the National Stage of International Application No. PCT/KR2020/006986, filed May 29, 2020, which claims the benefit of KR Patent Application No. 10-2020-0021447, filed Feb. 21, 2020, the contents of which are all hereby incorporated by reference herein in their entirety.

TECHNICAL FIELD

The present disclosure relates to a control of an intelligent cooking device.

BACKGROUND ART

An artificial intelligence (AI) technology consists of machine learning (deep learning) and element techniques using the machine learning.

The machine learning is an algorithm technique that classifies/learns features of input data by itself. The element technique is a technique for mimicking the human brain's perception and decision capabilities using a machine learning algorithm such as deep learning, and consists of technical fields such as linguistic understanding, visual understanding, inference/prediction, knowledge representation, and motion control.

Since a related art cooking device performs a heating operation according to the user's setting, it is necessary to continuously receive a new control command from the user for safety. Hence, there is a need for an intelligent cooking device in which an artificial intelligence technology is applied to a cooking device for user convenience and/or safety.

DISCLOSURE

Technical Problem

An object of the present disclosure is to address the above-described and other needs and/or problems.

Another object of the present disclosure is to implement a control of an intelligent cooking device capable of generating information on a control operation of the following order based on a current cooking state.

Another object of the present disclosure is to implement a control of an intelligent cooking device capable of changing a control operation based on a usage history of a user even if there is no control command of the user.

Another object of the present disclosure is to implement a control of an intelligent cooking device capable of receiving recipe information and performing a control operation based on a plurality of cooking steps included in the received recipe information.

Technical Solution

In one aspect of the present disclosure, there is provided a method of controlling an intelligent cooking device, the method comprising obtaining sensing information related to a cooking state of contents positioned inside a heating target during performing a first control operation; checking the cooking state of the contents based on the sensing information; and generating, based on the cooking state of the contents and a usage history, control information on a second control operation to be performed after an end of the first control operation.

The heating target may be overlappingly disposed on a heating area of the cooking device.

The contents may be ingredients that are an object of cooking.

The cooking state may include at least one of a temperature of the contents, a temperature of the heating target, a boiling state or a non-boiling state of the contents.

The control information may include a scheduled heating temperature or a scheduled heating time.

The method may further comprise generating a cooking order of a recipe format including respective control information related to the first and second control operations.

The method may further comprise performing the second control operation.

The performing of the control operation may comprise transmitting a guide message including the control information to a communicable external terminal; and determining the performing of the control operation based on a response received from the external terminal.

The external terminal may include an intelligent speaker, a smartphone, or a television (TV).

The method may further comprise transmitting a message for checking an activation state of the external terminal. The transmitting of the guide message may comprise transmitting the guide message when the external terminal is in the activation state.

When the external terminal is the intelligent speaker, the intelligent speaker may be converted into the activation state in response to an audio signal related to a movement of a user indoors.

When the external terminal is the TV, the activation state may be a state in which a power of the TV is turned on.

The method may further comprise identifying a user based on biometric information of the user; and loading the usage history corresponding to identification information of the user.

The biometric information may include at least one of a voiceprint, a fingerprint, or a face.

The generating of the control information may comprise applying the cooking state, control information related to the first control operation, or the usage history to a pre-trained learning model and generating the control information on the second control operation from an output of the learning model.

The learning model may be a neural network model in which a supervised-learning is performed by setting the cooking state, the control information related to the first control operation, or the usage history as an input and setting candidates of the control information on the second control operation as an output.

The usage history may be stored to match at least one of user information or a recipe.

The method may further comprise receiving a control message from a communicable personal terminal; and performing a control operation in response to the control message.

The method may further comprise establishing a communication connection with the personal terminal. The communication connection may be a wireless connection using one of WI-FI, a cellular network, or new radio (NR).

In another aspect of the present disclosure, there is provided an intelligent cooking device comprising at least one sensor configured to obtain sensing information related to a cooking state of contents positioned inside a heating target during performing a first control operation; and a processor configured to check the cooking state of the contents based on the sensing information and generate, based on the cooking state of the contents and a usage history of a user, control information on a second control operation to be performed after an end of the first control operation.

Advantageous Effects

Effects of a control of an intelligent cooking device according to an embodiment of the present disclosure are described as follows.

The present disclosure can generate information on a control operation of the following order based on a current cooking state.

The present disclosure can change a control operation based on a usage history of a user even if there is no control command of the user.

The present disclosure can receive recipe information and perform a control operation based on a plurality of cooking steps included in the received recipe information.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

FIG. 1 illustrates a block diagram of configuration of a wireless communication system to which methods described in the present disclosure are applicable.

FIG. 2 illustrates an example of a signal transmission/reception method in a wireless communication system.

FIG. 3 illustrates an example of a basic operation of a user equipment (UE) and a 5G network in a 5G communication system.

FIG. 4 illustrates a block diagram of an electronic device.

FIG. 5 illustrates a schematic block diagram of an AI server according to an embodiment of the present disclosure.

FIG. 6 illustrates a schematic block diagram of an AI device according to another embodiment of the present disclosure.

FIG. 7 is a concept diagram illustrating an implementation of an AI device.

FIG. 8 illustrates an AI cooking device to which an embodiment of the present disclosure is applied.

FIG. 9 illustrates an example of an AI cooking device to which an embodiment of the present disclosure is applied.

FIG. 10 is a flow chart illustrating a method of controlling an AI cooking device according to a first embodiment of the present disclosure.

FIG. 11 is a flow chart illustrating a method of controlling an AI cooking device according to a second embodiment of the present disclosure.

FIG. 12 is a flow chart illustrating a method of controlling an AI cooking device according to a third embodiment of the present disclosure.

FIG. 13 is a flow chart illustrating a method of controlling an AI cooking device according to a fourth embodiment of the present disclosure.

FIGS. 14 and 15 are flow charts illustrating a method of remotely controlling an AI cooking device according to some embodiments of the present disclosure.

FIGS. 16 to 22 illustrate implementations of various embodiments of the present disclosure.

MODE FOR INVENTION

Reference will now be made in detail to embodiments of the present disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

A. Example of Block Diagram of UE and 5G Network

FIG. 1 illustrates a block diagram of configuration of a wireless communication system to which methods described in the present disclosure are applicable.

Referring to FIG. 1, a device (AI device) including an AI module is defined as a first communication device 910 (see FIG. 1), and a processor 911 can perform detailed autonomous operations.

A 5G network including another device (AI server) communicating with the AI device is defined as a second device 920 (see FIG. 1), and a processor 921 can perform detailed AI operations.

The 5G network may be represented as the first communication device and the AI device may be represented as the second communication device.

For example, the first communication device or the second communication device may be a base station (BS), a network node, a transmitter UE, a receiver UE, a wireless device, a wireless communication device, a vehicle, a vehicle with a self-driving function, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service, or a device related to the fourth industrial revolution field.

For example, a terminal or user equipment (UE) may include a cellular phone, a smartphone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flight vehicle that flies by a radio control signal without a person being on the flight vehicle. For example, the VR device may include a device that implements an object or a background, etc. of a virtual world. For example, the AR device may include a device implemented by connecting an object or a background of a virtual world to an object or a background, etc. of a real world. For example, the MR device may include a device implemented by merging an object or a background of a virtual world with an object or a background, etc. of a real world. For example, the hologram device may include a device that records and reproduces stereoscopic information to implement a 360-degree stereoscopic image by utilizing a phenomenon of interference of light generated when two laser beams called holography meet. For example, the public safety device may include a video relay device or a video device that can be worn on the user's body. For example, the MTC device and the IoT device may be a device that does not require a person's direct intervention or manipulation. For example, the MTC device and the IoT device may include a smart meter, a vending machine, a thermometer, a smart bulb, a door lock, a variety of sensors, or the like. For example, the medical device may be a device used for the purpose of diagnosing, treating, alleviating, handling or preventing a disease. For example, the medical device may be a device used for the purpose of diagnosing, treating, alleviating or correcting an injury or a disorder. For example, the medical device may be a device used for the purpose of testing, substituting or modifying a structure or a function. For example, the medical device may be a device used for the purpose of controlling pregnancy. For example, the medical device may include a medical device, a surgical device, a (in vitro) diagnostic device, a hearing aid or a device for a surgical procedure, and the like. For example, the security device may be a device installed to prevent a possible danger and to maintain safety. For example, the security device may include a camera, CCTV, a recorder, or a black box, and the like. For example, the FinTech device may be a device capable of providing financial services, such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal via each antenna 926. The processor implements the above-described functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal via each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 illustrates an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE may acquire broadcast information in the cell by receiving a physical broadcast channel (PBCH) from the BS. Further, the UE may receive a downlink reference signal (DL RS) in the initial cell search step to check a downlink channel state. After initial cell search, the UE may acquire more detailed system information by receiving a physical downlink shared channel (PDSCH) according to a physical downlink control channel (PDCCH) and information included in the PDCCH (S202).

When the UE initially accesses the BS or has no radio resource for signal transmission, the UE may perform a random access procedure (RACH) for the BS (steps S203 to S206). To this end, the UE may transmit a specific sequence as a preamble via a physical random access channel (PRACH) (S203 and S205) and receive a random access response (RAR) message for the preamble via a PDCCH and the corresponding PDSCH (S204 and S206). For a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. In particular, the UE receives downlink control information (DCI) on the PDCCH. The UE monitors a set of PDCCH candidates in monitoring occasions configured to one or more control element sets (CORESETs) on a serving cell according to corresponding search space configurations. The set of PDCCH candidates to be monitored by the UE is defined in terms of search space sets, and the search space set may be a common search space set or a UE-specific search space set. The CORESET consists of a set of (physical) resource blocks with a duration of one to three OFDM symbols. A network may configure the UE to have a plurality of CORESETs. The UE monitors PDCCH candidates in one or more search space sets. Here, the monitoring means attempting to decode PDCCH candidate(s) in a search space. If the UE succeeds in decoding one of the PDCCH candidates in a search space, the UE determines that a PDCCH has been detected from the PDCCH candidates and performs PDSCH reception or PUSCH transmission based on DCI within the detected PDCCH. The PDCCH may be used to schedule DL transmissions on PDSCH and UL transmissions on PUSCH. Here, the DCI on the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

With reference to FIG. 2, an initial access (IA) procedure in a 5G communication system is additionally described.

The UE can perform cell search, system information acquisition, beam alignment for initial access, and DL measurement based on an SSB. The SSB is interchangeably used with a synchronization signal/physical broadcast channel (SS/PBCH) block.

The SSB includes a PSS, an SSS and a PBCH. The SSB consists of four consecutive OFDM symbols, and the PSS, the PBCH, the SSS/PBCH or the PBCH is transmitted per OFDM symbol. Each of the PSS and the SSS consists of one OFDM symbol and 127 subcarriers, and the PBCH consists of 3 OFDM symbols and 576 subcarriers.

The cell search refers to a process in which a UE acquires time/frequency synchronization of a cell and detects a cell identifier (ID) (e.g., physical layer cell ID (PCI)) of the cell. The PSS is used to detect a cell ID from a cell ID group, and the SSS is used to detect a cell ID group. The PBCH is used to detect an SSB (time) index and a half-frame.

There are 336 cell ID groups, and there are 3 cell IDs per cell ID group. A total of 1008 cell IDs are present. Information on a cell ID group to which a cell ID of a cell belongs is provided/acquired via an SSS of the cell, and information on the cell ID among 336 cell ID groups is provided/acquired via a PSS.

The SSB is periodically transmitted in accordance with SSB periodicity. A default SSB periodicity assumed by the UE during initial cell search is defined as 20 ms. After cell access, the SSB periodicity may be set to one of 15 ms, 10 ms, 20 ms, 40 ms, 80 ms, 160 ms by a network (e.g., a BS).

Next, acquisition of system information (SI) is described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS via a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

With reference to FIG. 2, a random access (RA) procedure in the 5G communication system is additionally described.

A random access procedure is used for various purposes. For example, the random access procedure can be used for network initial access, handover, and UE-triggered UL data transmission. The UE can acquire UL synchronization and UL transmission resources through the random access procedure. The random access procedure is classified into a contention-based random access procedure and a contention-free random access procedure. A detailed procedure for the contention-based random access procedure is as follows.

The UE can transmit a random access preamble via PRACH as Msg1 of a random access procedure in UL. Random access preamble sequences with two different lengths are supported. Long sequence length 839 is applied to subcarrier spacings of 1.25 kHz and 5 kHz, and short sequence length 139 is applied to subcarrier spacings of 15 kHz, 30 kHz, 60 kHz and 120 kHz.

When a BS receives the random access preamble from the UE, the BS sends a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, i.e., Msg1. Presence or absence of random access information with respect to Msg1 transmitted by the UE can be determined depending on presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission based on most recent path loss and a power ramping counter.

The UE can perform UL transmission as Msg3 of the random access procedure on a physical uplink shared channel based on the random access response information. The Msg3 may include an RRC connection request and a UE ID. The network may transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure may be divided into (1) a DL BM procedure using an SSB or a CSI-RS and (2) a UL BM procedure using a sounding reference signal (SRS). In addition, each BM procedure may include Tx beam swiping for determining a Tx beam and Rx beam swiping for determining an Rx beam.

The DL BM procedure using an SSB is described.

Configuration for a beam report using an SSB is performed upon configuration of channel state information (CSI)/beam in RRC_CONNECTED.

- A UE receives, from a BS, a CSI-ResourceConfig IE including CSI-SSB-ResourceSetList for SSB resources used for BM. The RRC parameter "csi-SSB-ResourceSetList" represents a list of SSB resources used for beam management and report in one resource set. An SSB resource set may be configured as {SSBx1, SSBx2, SSBx3, SSBx4, . . . }. An SSB index may be defined in the range of 0 to 63.
- The UE receives, from the BS, signals on SSB resources based on CSI-SSB-ResourceSetList.
- When CSI-RS reportConfig related to a report for SSBRI and reference signal received power (RSRP) is configured, the UE reports the best SSBRI and RSRP corresponding to this to the BS. For example, when reportQuantity of the CSI-RS reportConfig IE is configured to 'ssb-Index-RSRP', the UE reports the best SSBRI and RSRP corresponding to this to the BS.

When CSI-RS resource is configured to the same OFDM symbol(s) as SSB and 'QCL-TypeD' is applicable, the UE may assume that the CSI-RS and the SSB are quasi co-located (QCL) from the viewpoint of 'QCL-TypeD'. Here, 'QCL-TypeD' may mean that antenna ports are quasi co-located from the viewpoint of a spatial Rx parameter. When the UE receives signals of a plurality of DL antenna ports with a QCL-TypeD relationship, the same Rx beam can be applied.

Next, a DL BM procedure using a CSI-RS is described.

An Rx beam determination (or refinement) procedure of the UE and a Tx beam swiping procedure of the BS using a CSI-RS are sequentially described. A repetition parameter is set to 'ON' in the Rx beam determination procedure of the UE, and is set to 'OFF' in the Tx beam swiping procedure of the BS.

First, the Rx beam determination procedure of the UE is described.

The UE receives, from the BS, an NZP CSI-RS resource set IE including an RRC parameter for 'repetition' via RRC signaling. The RRC parameter 'repetition' is set to 'ON'.

The UE repeatedly receives signals on resource(s) in a CSI-RS resource set, in which the RRC parameter 'repetition' is set to 'ON', in different OFDM symbols through the same Tx beam (or DL spatial domain transmission filter) of the BS.

The UE determines its RX beam.

The UE skips a CSI report. That is, the UE may skip a CSI report when the RRC parameter 'repetition' is set to 'ON'.

Next, the Tx beam determination procedure of the BS is described.

The UE receives, from the BS, an NZP CSI-RS resource set IE including an RRC parameter for 'repetition' via RRC signaling. The RRC parameter 'repetition' is set to 'OFF' and is related to the Tx beam swiping procedure of the BS.

The UE receives signals on resources in a CSI-RS resource set, in which the RRC parameter 'repetition' is set to 'OFF', in different Tx beams (DL spatial domain transmission filter) of the BS.

The UE selects (or determines) a best beam.

The UE reports an ID (e.g., CRI) of the selected beam and related quality information (e.g., RSRP) to the BS. That is, when a CSI-RS is transmitted for the BM, the UE reports a CRI and RSRP with respect thereto to the BS.

Next, the UL BM procedure using an SRS is described.

The UE receives, from the BS, RRC signaling (e.g., SRS-Config IE) including a (RRC parameter) purpose parameter configured to 'beam management". The SRS-Config IE is used to configure SRS transmission. The SRS-Config IE includes a list of SRS-Resources and a list of SRS-ResourceSets. Each SRS resource set refers to a set of SRS-resources.

The UE determines Tx beamforming for SRS resources to be transmitted based on SRS-SpatialRelation Info included in the SRS-Config IE. SRS-SpatialRelation Info is configured per SRS resource and represents whether the same beamforming as beamforming used for an SSB, a CSI-RS or an SRS is applied per each SRS resource.

When SRS-SpatialRelationInfo is configured for SRS resources, the same beamforming as beamforming used for the SSB, CSI-RS or SRS is applied and transmitted. However, when SRS-SpatialRelationInfo is not configured for SRS resources, the UE randomly determines Tx beamforming and transmits an SRS through the determined Tx beamforming.

Next, a beam failure recovery (BFR) procedure is described.

In a beamformed system, radio link failure (RLF) may frequently occur due to rotation, movement or beamforming blockage of the UE. Thus, BFR is supported in NR to prevent frequent occurrence of RLF. The BFR is similar to a radio link failure recovery procedure and may be supported when the UE knows new candidate beam(s). For beam failure detection, the BS configures beam failure detection reference signals to the UE, and the UE declares beam failure when the number of beam failure indications from the physical layer of the UE reaches a threshold configured via RRC signaling within a period configured via RRC signaling of the BS. After the beam failure detection, the UE triggers beam failure recovery by initiating a random access procedure on PCell and performs the beam failure recovery by selecting a suitable beam (when the BS provides dedicated random access resources for certain beams, these are prioritized by the UE). The completion of the random access procedure is regarded as completion of beam failure recovery.

D. Ultra-Reliable and Low Latency Communication (URLLC)

URLLC transmission defined in NR may refer to (1) a relatively low traffic size, (2) a relatively low arrival rate, (3) extremely low latency requirements (e.g., 0.5 ms and 1 ms), (4) relatively short transmission duration (e.g., 2 OFDM symbols), (5) urgent services/messages, etc. In UL, transmission of traffic of a specific type (e.g., URLLC) needs to be multiplexed with another transmission (e.g., eMBB) scheduled in advance in order to satisfy more stringent latency requirements. In this regard, a method is provided, which provides information indicating preemption of specific resources to the pre-scheduled UE and allows a URLLC UE to use the corresponding resources for UL transmission.

NR supports dynamic resource sharing between eMBB and URLLC. eMBB and URLLC services may be scheduled on non-overlapping time/frequency resources, and URLLC transmission may occur in resources scheduled for ongoing eMBB traffic. An eMBB UE may not ascertain whether PDSCH transmission of the corresponding UE has been partially punctured, and the UE may not decode a PDSCH due to corrupted coded bits. In view of this, NR provides a preemption indication. The preemption indication may also be referred to as an interrupted transmission indication.

With regard to the preemption indication, the UE receives DownlinkPreemption IE via RRC signaling from the BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of locations for fields in DCI format 2_1 according to a set of serving cells and positionInDCI by INT-ConfigurationPerServing Cell including a set of serving cell indexes provided by serving-CellID, is configured with an information payload size for DCI format 2_1 by dci-Payloadsize, and is configured with indication granularity of time-frequency resources by time-FrequencySect.

The UE receives, from the BS, DCI format 2_1 based on the DownlinkPreemption IE.

If the UE detects DCI format 2_1 for a serving cell in a configured set of serving cells, the UE may assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in time-frequency resources indicated by preemption is not DL transmission scheduled to the UE, and decodes data based on signals received in the remaining resource region.

E. Massive MTC (mMTC)

Massive machine type communication (mMTC) is one of 5G scenarios for supporting a hyper-connection service that simultaneously communicate with a large number of UEs. In this environment, a UE intermittently performs communication with a very low speed and mobility. Thus, a main goal of mMTC is operating the UE for a long time at a low cost. In regard to mMTC technology, 3GPP deals with MTC and narrowband (NB)-IoT.

The mMTC technology has features such as repetitive transmission, frequency hopping, retuning, and a guard period of a PDCCH, a PUCCH, a physical downlink shared channel (PDSCH), a PUSCH, etc.

That is, PUSCH (or PUCCH (particularly, long PUCCH) or a PRACH) including specific information and PDSCH (or PDCCH) including a response to the specific information are repeatedly transmitted. The repetitive transmission is performed through frequency hopping. For the repetitive transmission, (RF) retuning from a first frequency resource to a second frequency resource is performed in the guard period, and the specific information and the response to the specific information may be transmitted/received through a narrowband (e.g., 6 resource blocks (RBs) or 1 RB).

F. AI Basic Operation Using 5G Communication

FIG. 3 illustrates an example of a basic operation of a user equipment (UE) and a 5G network in a 5G communication system.

The UE transmits specific information to the 5G network, in S1. The 5G network performs 5G processing on the specific information, S2. The 5G processing may include AI processing. The 5G network sends a response including a result of AI processing to the UE, in S3.

G. Applied Operation Between UE and 5G Network in 5G Communication System

An AI operation using 5G communication is described in more detail below with reference to FIGS. 1 and 2 and the wireless communication technology (BM procedure, URLLC, mMTC, etc.) described above.

First, a basic procedure of an applied operation, to which a method according to the present disclosure to be described later and eMBB of 5G communication are applied, is described.

As in steps S1 and S3 of FIG. 3, the UE performs an initial access procedure and a random access procedure with the 5G network prior to step S1 of FIG. 3, in order to transmit/receive signals, information, etc. to/from the 5G network.

More specifically, the UE performs an initial access procedure with the 5G network based on SSB, in order to acquire DL synchronization and system information. A beam management (BM) procedure and a beam failure recovery procedure may be added to the initial access procedure, and a quasi-co-location (QCL) relationship may be added in a process in which the UE receives a signal from the 5G network.

In addition, the UE performs a random access procedure with the 5G network for UL synchronization acquisition and/or UL transmission. The 5G network may transmit, to the UE, a UL grant for scheduling transmission of specific information. Thus, the UE transmits the specific information to the 5G network based on the UL grant. In addition, the 5G network transmits, to the UE, a DL grant for scheduling transmission of a result of 5G processing for the specific information. Thus, the 5G network may transmit, to the UE, a response including a result of AI processing based on the DL grant.

Next, a basic procedure of an applied operation, to which a method according to the present disclosure to be described later and URLLC of 5G communication are applied, is described.

As described above, after the UE performs the initial access procedure and/or the random access procedure with the 5G network, the UE may receive DownlinkPreemption IE from the 5G network. Then, the UE receives, from the 5G network, DCI format 2_1 including a preemption indication based on DownlinkPreemption IE. The UE does not perform (or expect or assume) reception of eMBB data in resources (PRBs and/or OFDM symbols) indicated by the preemption indication. Thereafter, when the UE needs to transmit specific information, the UE may receive a UL grant from the 5G network.

Next, a basic procedure of an applied operation, to which a method according to the present disclosure to be described later and mMTC of 5G communication are applied, is described.

Description will focus on parts in the steps of FIG. 3 which are changed according to application of mMTC.

In step S1 of FIG. 3, the UE receives a UL grant from the 5G network in order to transmit specific information to the 5G network. The UL grant may include information on the number of repetitions of transmission of the specific information, and the specific information may be repeatedly transmitted based on the information on the number of repetitions. That is, the UE transmits the specific information to the 5G network based on the UL grant. The repetitive transmission of the specific information may be performed through frequency hopping, the first transmission of the specific information may be performed in a first frequency resource, and the second transmission of the specific information may be performed in a second frequency resource. The specific information may be transmitted on a narrowband of 6 resource blocks (RBs) or 1 RB.

The 5G communication technology described above may be applied in combination with the methods according to the present disclosure to be described later, or may be supplemented to specify or clarify the technical features of methods described in the present disclosure.

FIG. 4 illustrates a block diagram of an electronic device.

Referring to FIG. 4, an electronic device 100 may include at least one processor 110, a memory 120, an output device 130, an input device 140, an input/output interface 150, a sensor module 160, and a communication module 170.

The processor 110 may include at least one application processor (AP), at least one communication processor (CP), or at least one artificial intelligence (AI) processor. The application processor, the communication processor, or the AI processor may be respectively included in different integrated circuit (IC) packages, or may be included in one IC package.

The application processor may control a plurality of hardware or software components connected to the application processor by running an operating system or an application program, and perform various data processing/operation including multimedia data. For example, the application processor may be implemented as a system on chip (SoC). The processor 110 may further include a graphic processing unit (GPU) (not shown).

The communication processor may perform functions of managing a data link and converting a communication protocol in communication between the electronic device 100 and other electronic devices connected via a network. For example, the communication processor may be implemented as the SoC. The communication processor may perform at least a portion of a multimedia control function.

In addition, the communication processor may control data transmission and reception of the communication module 170. The communication processor may be implemented to be included as at least a part of the application processor.

The application processor or the communication processor may load, on a volatile memory, and process a command or data that is received from at least one of a non-volatile memory or other components connected to each of the application processor and the communication processor. Further, the application processor or the communication processor may store data, that is received from at least one of other components or generated by at least one of the other components, in the non-volatile memory.

The memory 120 may include an internal memory or an external memory. The internal memory may include at least one of a volatile memory (e.g., dynamic RAM (DRAM), static RAM (SRAM), synchronous dynamic RAM (SDRAM), etc.) or a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.). According to an embodiment, the internal memory may take the form of a solid state drive (SSD). The external memory may include flash drive, for example, compact flash (CF), secure digital (SD), micro secure digital (Micro-SD), mini secure digital (Mini-SD), extreme digital (xD) or a memory stick, etc.

The output device 130 may include at least one of a display module or a speaker. The output device 130 may display various types of data including multimedia data, text data, voice data, etc. to a user or output the data as sound.

The input device 140 may include a touch panel, a digital pen sensor, a key, or an ultrasonic input device, etc. For example, the input device 140 may be the input/output interface 150. The touch panel may recognize a touch input in at least one of capacitive, pressure-sensitive, infrared, or ultrasonic types. In addition, the touch panel may further include a controller (not shown). In case of a capacitive touch panel, not only direct touch but also proximity recognition is possible. The touch panel may further include a tactile layer. In this case, the touch panel may provide a tactile reaction to the user.

The digital pen sensor may be implemented using the same or similar method to receiving a user's touch input or a separate recognition layer. The key may use a keypad or a touch key. The ultrasonic input device is a device that can confirm data by detecting a micro-sonic wave at a user equipment (UE) through a pen generating an ultrasonic signal, and is capable of wireless recognition. The electronic device 100 may also receive a user input from an external device (e.g., network, computer, or server) connected to the communication module 170 using the communication module 170.

The input device 140 may further include a camera module and a microphone. The camera module is a device capable of taking images and videos, and may include one or more image sensors, an image signal processor (ISP), or a flash LED. The microphone may receive a voice signal and convert it into an electrical signal.

The input/output interface 150 may transmit a command or data, that is input from the user through the input device or the output device, to the processor 110, the memory 120, the communication module 170, etc. through a bus (not shown). For example, the input/output interface 150 may provide the processor 110 with data for a user's touch input that is input through the touch panel. For example, the input/output interface 150 may output a command or data, that is received from the processor 110, the memory 120, the communication module 170, etc. through the bus, through the output device 130. For example, the input/output interface 150 may output voice data processed by the processor 110 to the user through the speaker.

The sensor module 160 may include at least one of a gesture sensor, a gyro sensor, an atmospheric pressure sensor, a magnetic sensor, an acceleration sensor, a grip sensor, a proximity sensor, an RGB (red, green, blue) sensor, a biometric sensor, a temperature/humidity sensor, an illuminance sensor, or an ultraviolet (UV) sensor. The sensor module 160 may measure physical quantity or sense an operating state of the electronic device 100 to convert measured or sensed information into electrical signals. Additionally or alternatively, the sensor module 160 may include an E-nose sensor, an electromyography (EMG) sensor, an electroencephalogram (EEG) sensor (not shown), an electrocardiogram (ECG) sensor, a photoplethysmography (PPG) sensor, a heart rate monitor (HRM) sensor, a perspiration sensor, a fingerprint sensor, or the like. The sensor module 160 may further include a control circuit for controlling at least one sensor included therein.

The communication module 170 may include a wireless communication module or an RF module. The wireless communication module may include, for example, Wi-Fi, BT, GPS or NFC. For example, the wireless communication module may provide a wireless communication function using a radio frequency. Additionally or alternatively, the wireless communication module may include a network interface or a modem, etc. for connecting the electronic device 100 to a network (e.g., Internet, LAN, WAN, telecommunication network, cellular network, satellite network, POTS or 5G network, etc.).

The RF module may be responsible for transmitting and receiving data, for example, transmitting and receiving an RF signal or a called electronic signal. For example, the RF module may include a transceiver, a power amp module (PAM), a frequency filter, or a low noise amplifier (LNA), etc. Further, the RF module may further include components, for example, conductors or lead wires, etc. for transmitting and receiving electromagnetic waves in a free space in wireless communication.

The electronic device 100 according to various embodiments of the present disclosure may include at least one of a server, a TV, a refrigerator, an oven, a clothing styler, a robot vacuum cleaner, a drone, an air conditioner, an air cleaner, a PC, a speaker, a home CCTV, an electric light, a washing machine, and a smart plug. Since the components of the electronic device 100 illustrated in FIG. 4 are exemplified as components generally provided in an electronic device, the electronic device 100 according to the embodiment of the present disclosure is not limited to the above-described components, and the components may be omitted and/or added, if necessary or desired.

The electronic device 100 may perform an artificial intelligence-based control operation by receiving a result of AI processing from a cloud environment illustrated in FIG. 5, or may perform the AI processing in an on-device manner by including an AI module in which components related to an AI process are integrated into one module.

With reference to FIGS. 5 and 6, an AI process performed in a device environment and/or a cloud environment or a server environment is described below. FIG. 5 illustrates an example where receiving data or signals can be performed in the electronic device 100, but A1 processing that processes the received data or signals is performed in the cloud environment. Contrastively, FIG. 6 illustrates an example of on-device processing in which an overall operation of AI processing for input data or signals is performed in the electronic device 100.

In FIGS. 5 and 6, the device environment may be referred to as a 'client device' or an 'AI device', and the cloud environment may be referred to as a 'server'.

FIG. 5 illustrates a schematic block diagram of an AI server according to an embodiment of the present disclosure.

A server 200 may include a processor 210, a memory 220, and a communication module 270.

An AI processor 215 may learn a neural network using a program stored in the memory 220. In particular, the AI processor 215 may learn the neural network for recognizing data related to an operation of an AI device 100. Here, the neural network may be designed to simulate the human brain structure (e.g., the neuronal structure of the human neural network) on a computer. The neural network may include an input layer, an output layer, and at least one hidden layer. Each layer may include at least one neuron with a weight, and the neural network may include a synapse connecting neurons and neurons. In the neural network, each neuron may output an input signal input through the synapse as a function value of an activation function for weight and/or bias.

A plurality of network modes may exchange data according to each connection relationship so that neurons simulate synaptic activity of neurons that exchange signals through the synapses. Here, the neural network may include a deep learning model developed from a neural network model. In the deep learning model, a plurality of network nodes are located on different layers and may exchange data according to a convolution connection relationship. Examples of the neural network model may include various deep learning techniques such as a deep neural network (DNN), a convolutional neural network (CNN), a recurrent neural network, a restricted Boltzmann machine, a deep belief network, and a deep Q-Network, and may be applied in fields such as vision recognition, voice recognition, natural language processing, and voice/signal processing.

The processor 210 performing the functions described above may be a general-purpose processor (e.g., a CPU), but may be a dedicated AI processor (e.g., a GPU) for AI learning.

The memory 220 may store various programs and data necessary for the operation of the AI device 100 and/or the server 200. The memory 220 may be accessed by the AI processor 215, and may read/write/modify/delete/update data by the AI processor 215. In addition, the memory 220 may store a neural network model (e.g., the deep learning model) generated through a learning algorithm for data classification/recognition according to an embodiment of the present disclosure. Furthermore, the memory 220 may store not only a learning model 221 but also input data, training data, and learning history, etc.

The AI processor 215 may include a data learning unit 215a for learning a neural network for data classification/recognition. The data learning unit 215a may learn criteria regarding what training data to use to determine data classification/recognition, and how to classify and recognize the data using the training data. The data learning unit 215a may learn the deep learning model by acquiring training data to be used for learning and applying the acquired training data to the deep learning model.

The data learning unit 215a may be manufactured in a form of at least one hardware chip and may be mounted on the server 200. For example, the data learning unit 215a may be manufactured in a form of a dedicated hardware chip for artificial intelligence, or may be manufactured as part of a general-purpose processor (CPU) or a dedicated graphics processor (GPU) and mounted on the server 200. In addition, the data learning unit 215a may be implemented as a software module. When the data learning unit 215a is implemented as the software module (or a program module including instructions), the software module may be stored in a non-transitory computer readable media. In this case, at least one software module may be provided to an operating system (OS), or may be provided by an application.

The data learning unit 215a may learn the neural network model to have criteria for determining how to classify/recognize preset data using the acquired training data. In this instance, a learning method by a model learning unit may be classified into supervised learning, unsupervised learning, and reinforcement learning. Here, the supervised learning may refer to a method of learning an artificial neural network in a state where a label for training data is given, and the label may mean a correct answer (or a result value) that the artificial neural network has to infer when the training data is input to the artificial neural network. The unsupervised learning may mean a method of learning an artificial neural network in a state where the label for training data is not given. The reinforcement learning may mean a method in which an agent defined in a specific environment is learned to select an action or a sequence of actions that maximize cumulative rewards in each state. Further, the model learning unit may learn the neural network model using a learning algorithm including an error backpropagation method or a gradient decent method. When the neural network model is learned, the learned neural network model may be referred to as the learning model 221. The learning model 221 is stored in the memory 220 and may be used to infer a result for new input data rather than the training data.

The AI processor 215 may further include a data pre-processing unit 215b and/or a data selection unit 215c, in order to improve analysis results using the learning model 221 or to save resources or time required to generate the learning model 221.

The data pre-processing unit 215b may pre-process the acquired data so that the acquired data can be used for learning/inference for determining a situation. For example, the data pre-processing unit 215b may extract feature information as pre-processing for input data acquired through the input device, and the feature information may be extracted in a format such as a feature vector, a feature point, or a feature map.

The data selection unit 215c may select data necessary for learning among training data or training data pre-processed by the pre-processing unit. The selected training data may be provided to the model learn unit. For example, the data selection unit 215c may select only data for an object included in a specific region as training data by detecting the specific region among images acquired through a camera of the electronic device. Further, the selection unit 215c may select data necessary for inference among input data acquired through the input device or input data pre-processed by the pre-processing unit.

The AI processor 215 may further include a model evaluation unit 215d to improve the analysis results of the neural network model. The model evaluation unit 215d may input evaluation data into the neural network model and may allow the model learning unit to learn again when an analysis result output from the evaluation data does not satisfy a predetermined criterion. In this case, the evaluation data may be preset data for evaluating the learning model 221. For example, among the analysis results of the learned neural network model for the evaluation data, when the number or ratio of evaluation data whose analysis results are not accurate exceeds a preset threshold, the model evaluation unit 215d may evaluate that a predetermined criterion are not satisfied.

The communication module 270 may send a result of AI processing by the AI processor 215 to an external electronic device.

As described above, FIG. 5 illustrates that the AI process is implemented in the cloud environment due to computing operation, storage, and power constraints, by way of example, but the present disclosure is not limited thereto. For example, the AI processor 215 may be implemented by being included in a client device. FIG. 6 is an example in which AI processing is implemented in the client device, and is substantially the same as that illustrated in FIG. 5 except that the AI processor 215 is included in the client device.

FIG. 6 illustrates a schematic block diagram of an AI device according to another embodiment of the present disclosure.

The function of each configuration illustrated in FIG. 6 may refer to FIG. 5. However, since the AI processor is included in a client device 100, it may not be necessary to communicate with the server 200 (see FIG. 5) in performing a process such as data classification/recognition, etc., and hence an immediate or real-time data classification/recognition operation is possible. Further, since it is not necessary to send personal information of the user to the server 200 (see FIG. 5), it is possible to classify/recognize data for the purpose without leaking the personal information.

The respective components illustrated in FIGS. 5 and 6 indicate functional components that are divided functionally, and it is noted that at least one component can be implemented in a form (e.g., AI module) integrated with each other in a real physical environment. It goes without saying that components that are not disclosed may be included or omitted, in addition to the plurality of components illustrated in FIGS. 5 and 6.

FIG. 7 is a conceptual diagram of an AI device according to an embodiment of the present disclosure.

Referring to FIG. 7, in an AI system 1, at least one of an AI server 106, a robot 101, an autonomous vehicle 102, an XR device 103, a smartphone 104, or a home appliance 105 is connected to a cloud network NW. The robot 101, the autonomous vehicle 102, the XR device 103, the smartphone 104, or the home appliance 105 applied with the AI technology may be referred to as the AI devices 101 to 105.

The cloud network NW may mean a network that forms a part of a cloud computing infrastructure or exists in the cloud computing infrastructure. The cloud network NW may be configured using the 3G network, the 4G or Long Term Evolution (LTE) network, or the 5G network.

That is, the respective devices 101 to 106 constituting the AI system 1 may be connected to each other via the cloud network NW. In particular, the respective devices 101 to 106 may communicate with each other through a base station, but may directly communicate with each other without going through the base station.

The AI server 106 may include a server performing AI processing and a server performing operations on big data.

The AI server 106 may be connected to at least one of the robot 101, the autonomous vehicle 102, the XR device 103, the smartphone 104, or the home appliance 105, which are AI devices constituting the AI system, via the cloud network NW, and may assist at least a part of the AI processing of the connected AI devices 101 to 105.

In this instance, the AI server 106 may learn the artificial neural network according to a machine learning algorithm instead of the AI devices 101 to 105, and directly store the learning model or send it to the AI devices 101 to 105.

In this instance, the AI server 106 may receive input data from the AI devices 101 to 105, infer a result value for the received input data using the learning model, generate a response or a control command based on the inferred result value, and transmit it to the AI devices 101 to 105.

Alternatively, the AI devices 101 to 105 may infer the result value for the input data directly using the learning model and generate a response or a control command based on the inferred result value.

The AI device according to the present disclosure may be applied to an AI cooking device. The AI cooking device may include an electric range (e.g., cooktop), an oven, etc. to which an artificial intelligence technology is applied, but is not limited thereto. Various embodiments of the present disclosure illustrate and describe a heating device such as a cooktop. The AI cooking device can be used interchangeably with a 'cooktop (or AI cooktop)' or an 'electric range (or AI electric range)'.

FIG. 8 illustrates an AI cooking device to which an embodiment of the present disclosure is applied.

The components illustrated in FIG. 8 indicate functional components that are divided functionally, and it is noted that at least one component can be implemented in a form integrated with each other in a real physical environment. FIG. 8 illustrates a plurality of components included in an AI cooking device 300, but it goes without saying that components that are not disclosed can be included in the AI cooking device 300.

The AI cooking device 300 may include a processor 340. The processor 340 may include at least one of a user authentication unit (not shown), a cooking state learning unit 341, a cooking content recognition unit 342, a command processing unit 343, or a remote control unit 344. The functional components described above may be implemented in a form that combines or interacts with each other in a physical environment.

The user authentication unit (not shown) may identify a user based on at least one biometric information related to the user. The biometric information may include a voiceprint, a fingerprint, or a face, but is not limited thereto. The user authentication unit (not shown) may execute a process of identifying the user based on the above-described biometric information and provide a personalized cooking service based on a result of execution. For example, if a first person and a second person cook the same or similar dish with different recipes, the user authentication unit (not shown) may identify a user based on biometric information of the first person or the second person, and provide a recipe corresponding to each user based on a result of identification.

The cooking state learning unit 341 may check a state of an object being currently cooked through the AI cooking device 300. For example, the cooking state learning unit 341 may sense an intensity of heat applied through a heating unit, a current temperature, cooking time, boiling of food, etc. via setting information of the electronic device or sensing information acquired through a sensor, and store it in a memory 320.

The cooking content recognition unit 342 may infer a cooking content of a dish being cooked through the AI cooking device 300. The cooking content includes one step constituting a recipe. For example, the cooking content may include the one step constituting the recipe, such as 'heat the contents for 5 minutes while they are boiling', 'heat the contents until they boil at intensity level 3', etc. The AI cooking device 300 performing a cooking process through a heating surface heating a cookware positioned at an upper part cannot visually check contents of the cookware placed on the heating surface. Thus, the AI device may check the cooking content based on a pre-trained learning model and the setting information and/or the sensing information. The checked cooking content may be used as basic information for predicting another step after the one step corresponding to the cooking content.

The command processing unit 343 may control the AI cooking device 300 to analyze a command of the user and perform a function corresponding to the command. The command of the user may include a text command or a voice command. The text command is a command signal including a command from an external terminal capable of communicating with the AI cooking device 300. The AI cooking device 300 may receive the command signal from the external terminal through a transceiver 330. The voice command is a command signal including a command received through a microphone of the AI cooking device 300. The voice command may control the transceiver 330 to receive a voice signal received from the external terminal (e.g., smartphone, smart remote control, etc.) capable of communicating with the AI cooking device 300 as well as a voice signal received though the microphone included in the AI cooking device 300.

The remote control unit 344 may control the transceiver 330 to transmit a guide message for remote control to the external terminal. The guide message may transmit a guide message including the cooking state or cooking content of the AI cooking device 300 to the external terminal. If the remote control unit 344 receives a response to the guide message, the remote control unit 344 may provide an additional control operation based on the received response.

Some of at least one component constituting the processor 340 may be omitted.

The AI cooking device 300 may include the memory 320. The memory 320 may store a function corresponding to each of at least one user. The memory 320 may store information on the one step of the above recipe constituting multiple recipes. The processor 340 may load the function and the information on the one step stored in the memory 320 and use them in various processes.

The AI cooking device 300 may include a sensor 310. The sensor 310 may include a gyro sensor 320, an acceleration sensor 330, or a thermal sensor 330. The AI cooking device 300 may detect whether the contents are boiling based on sensing information sensed through the gyro sensor 320 and/or the acceleration sensor 330. Specifically, if the contents in the cookware are boiling, vibration may occur in the cookware. The gyro sensor 320 and/or the acceleration sensor 330 may detect a boiling state or a non-boiling state by sensing vibration or tapping generated from the cookware. Further, the thermal sensor 330 may sense heat of the cookware generated based on the setting information. For example, even if 100 degrees is set in the cookware, different temperatures may be set depending on a type of material of the cookware. In order to perform a cooking operation in which the temperature difference is corrected, the thermal sensor 330 may sense an actual temperature of the cookware.

Some components disclosed in the AI cooking device 300 are single components, and may appear multiple times in a single device. For example, the AI cooking device 300 may include a plurality of input devices, output devices, or a plurality of controllers/processor 340.

FIG. 9 illustrates an example of an AI cooking device to which an embodiment of the present disclosure is applied.

Referring to FIG. 9, the AI cooking device 300 may include a first heating area 391, a second heating area 392, a third heating area 393, or an input interface 380. The first to third heating areas 391, 392 and 393 and/or the input interface 380 may be formed on an upper plate of the AI cooking device 300. The upper plate may be made of a glass material or a plastic material. The upper plate in the first to third heating areas 391, 392 and 393 may transfer heat generated from a working coil to an object to be heated. The AI cooking device 300 may heat some of the plurality of heating areas in a first manner in which the upper plate is heated using heat generated from a coil (e.g., a heating wire) positioned below the heating area, and may heat the others of the plurality of heating areas in a second manner in which the cookware itself positioned on the heating area is heated using a magnetic field generated from the coil positioned below the heating area. The AI cooking device 300 may set the first to third heating areas 391, 392 and 393 to select either the first manner or the second manner or combine the first manner and the second manner. The number or range of the heating areas illustrated in FIG. 9 is one of various implementations of the heating area, and is not limited thereto.

The input interface 380 may be disposed to be embedded in parallel to the upper plate. The input interface 380 may display specific images of various functions. The input interface 380 may receive a touch input by the user and transmit the received touch input to the processor. For example, the input interface 380 may include power on/off, locking related to the touch input, Wi-Fi connection or disconnection, whether remote control is available, temporary lowering, selection of any one of the first to third heating areas 391, 392 and 393, turbo input to heat up rapidly, or interface icons for timers, etc. FIG. 9 illustrates merely an example of the interface icon.

FIG. 10 is a flow chart illustrating a method of controlling an AI cooking device according to a first embodiment of the present disclosure.

Referring to FIG. 10, an AI cooking device may obtain sensing information related to a cooking state, in S110.

The sensing information may include temperature information. The temperature information may include a temperature of a heating target, and a temperature of contents contained in the heating target. There is a difficulty in measuring the temperature of contents contained in the heating target since the contents do not directly contact the AI cooking device. Thus, the AI cooking device may infer the temperature of the contents based on a type of material of the heating target and a type of the contents.

Vibration information may sense a vibration of a heating surface of the AI cooking device by using an acceleration sensor and/or a gyro sensor. In this instance, the vibration information may include a vibration pattern of the heating surface. The vibration pattern may include an intensity and frequency of the vibration, and the AI cooking device may determine either a boiling state or a non-boiling state of the contents contained in the heating target based on the vibration pattern. That is, the vibration information may refer to status information related to the boiling of the contents.

The AI cooking device may check the cooking state based on the sensing information, in S120.

The AI cooking device may generate control information related to a new control operation, in S130.

As described above, the AI cooking device may collect the sensing information related to the cooking state and infer the cooking state of the heating target even during the cooking operation based on the collected sensing information. The AI cooking device may generate subsequent new control information based on the inferred cooking state. The AI cooking device may also combine in time series control information related to the existing control operation and the control information related to the new control operation to generate one control order (e.g., cooking order). The control order includes at least one control operation in time series. The control order may be stored in, for example, a predetermined recipe format.

As described above, the AI cooking device detects a current state and generates a new control value or control information based on a result of detection, and hence may change the control operation even if it does not receive a manual input via the input interface. The AI cooking device may use a pre-trained learning model in order to generate the control information related to the new control operation. The learning model may be an artificial neural network-based model in which a training process is performed by repeating, as a training data set, a plurality of input data and labeling information (e.g., candidates as output to the input) given to the input data multiple times.

The input data may include one or two or more of the following information.

Cooking state

Control information of a first control operation corresponding to the cooking state Usage history The cooking state may be checked in S120. The control information of the first control operation indicates control information set to the AI cooking device when the first control operation is performed. The usage history may be stored to match user information and/or recipes. For example, the usage history may tag 'USER A' and may be recorded in a memory. In this instance, the AI cooking device may retrieve the usage history or usage log of 'USER A' using identification information of 'USER A'. As another example, the usage history may tag 'USER A and Recipe={Cheese gratin}' and may be recorded in a memory. Even for the same recipe, some modified cooking may be performed according to the user. In this instance, the AI cooking device may retrieve the usage history or usage log according to a type of the user and the recipe and utilize it for AI processing.

The labeling information may include candidates of control information related to a new second control operation.

In other words, the AI cooking device according to an embodiment of the present disclosure may store, in the memory, a learning model in which supervised-learning is performed by setting the cooking state, first control information related to the current first control operation, and/or the usage history as an input and setting the control information related to the new second control operation as an output. As a result, the AI cooking device may perform a new control operation using trained learning model and preset input data even if an input via the input interface is not received. For example, the AI cooking device may set the cooking state, the control information related to the first control operation, and/or the usage history as an input to generate probability values for the respective candidates of the control information related to the second control operation. Control information corresponding to a highest probability value among the probability values may be applied to the AI cooking device in performing the second control operation. That is, the AI cooking device may apply the above-described input data to the pre-trained learning model and generate the control information related to the second control operation from the output.

The labeling information and the label may be used interchangeably. Further, input data may be used interchangeably with input or input information.

FIG. 11 is a flow chart illustrating a method of controlling an AI cooking device according to a second embodiment of the present disclosure.

Referring to FIG. 11, an AI cooking device may check a start of cooking, in S210.

The AI cooking device may identify a user based on biometric information of the user, in S220. When the user is identified as a registered user ('Yes' in S220), the AI cooking device may load a usage history corresponding to identification information (e.g., ID) of the registered user. The biometric information for identifying the user may include at least one of a voiceprint, a fingerprint, or a face, but is not limited thereto. When the user is identified as an unregistered user based on the biometric information ('No' in S220), the AI cooking device may store the input biometric information in a memory or transmit it to an external server. When the same user of the stored or transmitted biometric information described above uses later the AI cooking device, the stored or transmitted biometric information may be used to inquire the usage history of the same user.

Next, the AI cooking device may obtain sensing information related to a cooking state of contents positioned inside a heating target while performing a control operation, in S230.

The AI cooking device may check the cooking state of the contents based on the sensing information, in S240.

The AI cooking device may generate control information for performing a new control operation, in S250.

The AI cooking device may perform the new control operation, in S260.

The steps S230, S240 and S250 correspond to the steps S110, S120 and S130 of FIG. 10, respectively.

FIG. 12 is a flow chart illustrating a method of controlling an AI cooking device according to a third embodiment of the present disclosure.

Referring to FIG. 12, an AI cooking device may check a start of cooking, in S310.

The AI cooking device may identify a user based on biometric information of the user, in S320. When the user is identified as a registered user ('Yes' in S320), the AI cooking device may load a usage history corresponding to identification information (e.g., ID) of the registered user. When the user is identified as an unregistered user based on the biometric information ('No' in S320), the AI cooking device may store the input biometric information in a memory or transmit it to an external server.

Next, the AI cooking device may obtain sensing information related to a cooking state of contents positioned inside a heating target while performing a control operation, in S330.

The AI cooking device may check the cooking state of the contents based on the sensing information, in S340.

The AI cooking device may generate control information for performing a new control operation, in S350.

The AI cooking device may transmit a message including the generated control information to an external terminal, in S360. The external terminal may be a user equipment (UE). The UE indicates a terminal in which specific user information is recorded in a device. The user information may include identification information for identifying the user among a plurality of persons. The AI cooking device may sense the UE based on the user information. The AI cooking device may establish a communication connection with the personal terminal. The communication connection includes a communication connection using WI-FI, cellular network, or new radio (NR). In particular, for the NR, the AI cooking device may control the communication module (e.g., transceiver) to transmit a guide message including the control information to the external terminal included in the 5G network. The communication connection is described in detail later in S370.

The message is a guide message and may include the control information as one element. For example, the guide message may include a text of "Heat for 5 minutes at intensity level 6" and/or an image related to the text. As another example, the guide message may include information on a recipe such as "Step 3 out of 5 steps for full recipe; for 5 minutes: heat at intensity level 6" (e.g., the name of cooking or dish, multiple cooking steps included in the recipe, etc.), a text, and/or an image related to the text. The processor may control the transceiver to transmit the message to the external terminal. Herein, the external terminal may include one of an intelligent speaker, a smartphone, or a TV (or smart TV).

The AI cooking device may control the communication module to receive a response to the guide message from the external terminal, in S370.

The AI cooking device may perform an initial access procedure with the 5G network in order to transmit the guide message to the 5G network. The AI cooking device may perform the initial access procedure with the 5G network based on a synchronization signal block (SSB). The AI cooking device may receive, from the 5G network, downlink control information (DCI) that is used to schedule the transmission of the guide message through the transceiver. The guide message may be transmitted to the 5G network on a PUSCH, and the SSB and a DM-RS of the PUSCH may be QCLed for QCL type D.

A transmission scenario of the guide message via the 5G network according to the above-described embodiment transmits a result of AI processing by the processor (e.g., AI processor) included in the AI cooking device. In this instance, since the AI processing for generating new control information is performed by the processor of the AI cooking device, there may be a limit in terms of control speed and control capacity.

A method of controlling an intelligent cooking device according to another embodiment of the present disclosure may transmit 'sensing information related to a cooking state' or a 'cooking state checked from the sensing information related to the cooking state' to an AI computing device included in the 5G network. In this instance, the AI cooking device may receive AI-processed information (e.g., control information on a new control operation) and perform the control operation based on the received AI-processed information.

The AI cooking device may perform the control operation based on the received response, in S380.

The steps S330, S340 and S350 correspond to the steps S110, S120 and S130 of FIG. 10, respectively. Further, the steps S310, S320 and S315 correspond to the steps S210, S220 and S215 of FIG. 11, respectively.

As above, the AI cooking device may perform a control operation, that is more suitable for an intention of the user than a control process determined by itself, by transmitting a guide message requesting a response to a communicable external terminal and performing the control operation based on the response. However, one or more Internet of Things (IoT) devices that are communication-connected via the network are becoming more diverse in the modern society. Thus, when the AI cooking device transmits the guide message to the external terminal, there is a need to transmit the guide message to the external terminal at which the user is positioned, or which the user can immediately check or is using. Alternatively, if the AI cooking device transmits the guide message to all the external terminals that are simply communication-connected, unnecessary guide messages are simultaneously output, resulting in inefficiency. An embodiment including an operation of checking an activation state of the external terminal in order to solve this problem is described below with reference to FIG. 13.

FIG. 13 is a flow chart illustrating a method of controlling an AI cooking device according to a fourth embodiment of the present disclosure.

Referring to FIG. 13, an AI cooking device may check a start of cooking, in S410.

The AI cooking device may identify a user based on biometric information of the user, in S420. When the user is identified as a registered user ('Yes' in S420), the AI cooking device may load a usage history corresponding to identification information (e.g., ID) of the registered user. When the user is identified as an unregistered user based on the biometric information ('No' in S420), the AI cooking device may store the input biometric information in a memory or transmit it to an external server.

Next, the AI cooking device may obtain sensing information related to a cooking state of contents positioned inside a heating target while performing a control operation, in S430.

The AI cooking device may check the cooking state of the contents based on the sensing information, in S440.

The AI cooking device may generate control information for performing a new control operation, in S450.

The AI cooking device may check an activation state of an external terminal, in S460. Specifically, the AI cooking device may transmit, to the external terminal, a signal (or message) for checking a wake-up state of the external terminal. The wake-up state indicates that the external terminal is in a turn-on state. The wake-up state may vary depending on a type of the external terminal.

For example, if the external terminal is an AI speaker, when an audio signal related to a movement of the user is detected indoors, the external terminal may be converted into the wake-up state in response to the audio signal.

As another example, if the external terminal is a display device (e.g., TV), the wake-up state may include a state in which the display device is turned on or a presence of the user viewing the display device is sensed through a camera included in the display device.

As another example, if the external terminal is a mobile terminal (e.g., smartphone), the wake-up state includes a state in which the external terminal is turned on by the user and satisfies a preset condition. The preset condition may include a condition in which a lock state is released by the user within a set time, or a touch input is applied through a touch screen.

As above, an intelligent cooking device control system according to some embodiments of the present disclosure may include an AI cooking device and an external terminal capable of communicating with the AI cooking device. The intelligent cooking device control system may determine the external terminal, that is positioned adjacent to the user, is being used by the user, or has an intent to use, as a wake-up state and may control the intelligent cooking device through an operation associated with the external terminal determined as the wake-up state. As a result, it is possible to save unnecessary consumption of resources, such as transmitting a guide message to a large number of unnecessary external terminals.

The wake-up state may be used interchangeably with the activation state. An activation state according to some embodiments of the present disclosure may indicate a turn-on state in which a general control operation is performed through the device. However, an activation state according to other some embodiments of the present disclosure does not indicate a simple turn-on state and indicates a state that the user is using or can immediately use in order to immediately receive an input or a response of the user.

The AI cooking device may transmit a message including the generated control information to the external terminal, in S470.

The AI cooking device may control a communication module to receive a response to a guide message from the external terminal, in S480.

The AI cooking device may perform the control operation based on the received response, in S490.

The steps S430, S440 and S450 correspond to the steps S110, S120 and S130 of FIG. 10, respectively. Further, the steps S410, S420 and S415 correspond to the steps S210, S220 and S215 of FIG. 11, respectively. The steps S470, S480 and S490 correspond to the steps S360, S370 and S380 of FIG. 12, respectively.

FIGS. 14 and 15 are flow charts illustrating a method of remotely controlling an AI cooking device according to some embodiments of the present disclosure. The AI cooking device performs a control operation in association with a communicable external terminal in the some embodiments described above. In this instance, there is a need to set a criterion for remotely determining, through a mobile terminal, whether to perform the control operation.

Referring to FIG. 14, if a distance between the AI cooking device and the mobile terminal is equal to or greater than a reference value ('Yes' in S510), the AI cooking device may execute a remote control mode, in S520. The AI cooking device may monitor the distance with the mobile terminal. For example, the AI cooking device may receive location information of a communicable mobile terminal from the mobile terminal. In this instance, the mobile terminal includes a location information generation module (e.g., GPS, etc.).

The control of the AI cooking device may be generally closely related to user safety. Accordingly, it is a common belief in society that it is dangerous for the user to move away from the cooking device. In light of this, when the user is far away from the cooking device and is performing other activities, the necessity of the remote control mode may be more important. Thus, even if there is no remote control request, the AI cooking device may be converted into the remote control mode in response to a change in the distance when the mobile terminal is spaced apart from the AI cooking device by a preset reference value or more. When the AI cooking device is converted into the remote control mode, the AI cooking device may transmit a message informing the execution of the remote control mode to the mobile terminal that is spaced apart from the AI cooking device by the preset reference value or more.

The mobile terminal applied to the control method according to some embodiments of the present disclosure may mean a mobile terminal of the wake-up state in the same manner as the mobile terminal according to an embodiment of the present disclosure described above in S460 of FIG. 13. That is, since it is inefficient to monitor distances between the AI cooking device and all the mobile terminals, efficiency can be enhanced by monitoring the distance change of the mobile terminal of the wake-up state.

Referring to FIG. 15, if a remote control request is received from an external terminal ('Yes' in S610), the AI cooking device may execute a remote control mode, in S620. The external terminal indicates a terminal in which a communication connection for remote control has been established in advance. If the AI cooking device receives a message requesting the remote control, the AI cooking device may be converted into the remote control mode in response to the reception of the message. When the remote control mode is being executed, the AI cooking device may receive, from the external terminal, a message including a signal controlling an operation of the AI cooking device, and may perform a control operation corresponding to the received message. If the AI cooking device according to an embodiment of the present disclosure is converted into the remote control mode, it may periodically transmit a message including a cooking state to a communicable external terminal.

FIGS. 16 to 22 illustrate implementations of various embodiments of the present disclosure.

Referring to FIG. 16, a plurality of cooking steps R16001, ..., R1600N are performed to cook a specific dish (F). All the plurality of cooking steps R16001, ..., R1600N may be referred to as a recipe R1600. In the various embodiments described above, one control operation means one of the plurality of cooking steps R16001, ..., R1600N.

If one control operation is completed in a process of cooking the specific dish (F) including the plurality of cooking steps, the AI cooking device 300 may perform other control operations generated as a result of AI processing. For example, the AI cooking device 300 may collect a cooking state, control information related to STEP 1, and/or a usage history of the user for the full recipe R1600 while performing the STEP 1 R16001 of the full recipe R1600. The AI cooking device 300 may generate, based on the collected information, a time to end the STEP 1 and control information on STEP 2 to be performed after the STEP 1. In this instance, the learning model and the sensing information described in FIGS. 10 to 13 may be used to generate the control information of the STEP 2. If the last cooking step 1600N is completed, the AI cooking device 300 may finish the cooling process for the full recipe R1600 and may store, in the memory, changes in the sensing information and/or the control information received during performing the control operation based on the full recipe R1600. As above, the stored information may be used in a subsequent process of re-training the learning model.

Referring to FIGS. 17 and 18, a user (U) may check information on the AI cooking device 300 using a mobile terminal 400A. For example, the AI cooking device 300 may transmit a guide message to the communicable mobile terminal 400A. The guide message includes information on a control operation of the next order. For example, the guide message may include information such as "NEXT/Intensity: 4/Time: 5 min". "NEXT" is an indication indicating a subsequent control operation and may be used interchangeably with another indicator. The "Intensity" indicates a heating intensity of the AI cooking device 300. The "Time" indicates a total control time of the next control operation.

The mobile terminal 400A may receive a response of the user (U) to the guide message. For example, the response to the guide message may be a positive or negative response to a new control operation. The AI cooking device 300 may perform or not perform a next new control operation based on the received positive or negative response. As another example, the response to the guide message may be a text message describing a new control operation. The AI cooking device 300 may perform natural language processing through the processor. The natural language processing may analyze a text to analyze the intent or extract the entity name. If the AI cooking device 300 receives a text message of the user (U), the AI cooking device 300 may apply the received text message to a natural language engine and extract one cooking step included in the text message. The AI cooking device 300 may perform a subsequent control operation based on the extracted one cooking step.

Referring to FIGS. 19 and 20, the user (U) may check information on the AI cooking device 300 using a display device 400B. The contents overlapping with those of FIGS. 18 and 19 are omitted.

The AI cooking device 300 may transmit a guide message to the communicable display device 400B. The guide message includes information on a control operation of the next order. For example, the guide message may include information such as "NEXT/Intensity: 4/Time: 5 min". If the display device 400B receives the guide message, the display device 400B may output the received guide message through a display unit (e.g., a display panel). In this instance, the guide message may be displayed on a partial area of the display unit.

The display device 400B may receive a response of the user (U) to the guide message. In an embodiment, if the display device 400B receives a specific signal of a remote control device set to be associated with the display device 400B while outputting the guide message, the display device 400B may transmit the response to the guide message to the AI cooking device 300 based on the specific signal. Examples of the remote control device may include a television remote control, a smartphone, a tablet PC, etc., but the present disclosure is not limited thereto. The specific signal may be a positive or negative response to a new control operation. The AI cooking device 300 may perform or not perform a next new control operation based on the received positive or negative response. As another example, the display device 400B may transmit a text message describing a new control operation instead of the specific signal. The text message may be input to the display device 400B by the remote control device. For example, the user (U) may input a text to the display device 400B using a plurality of input units included in the remote control device.

The AI cooking device 300 may perform natural language processing through the processor. The natural language processing may analyze the text to analyze the intent or extract the entity name. If the AI cooking device 300 receives a text message of the user (U), the AI cooking device 300 may apply the received text message to a natural language engine and extract one cooking step included in the text message. The AI cooking device 300 may perform a subsequent control operation based on the extracted one cooking step.

Referring to FIGS. 21 and 22, the user (U) may check information on the AI cooking device 300 using an AI speaker 400C. The contents overlapping with those of FIGS. 18 and 19 are omitted. The AI speaker 400C may be interchangeably used with an intelligent speaker.

The AI cooking device 300 may transmit a guide message to the communicable AI speaker 400C. The guide message includes information on a control operation of the next order. For example, the guide message may include information such as "NEXT/Intensity: 4/Time: 5 min". If the AI speaker 400C receives the guide message, the AI speaker 400C may output the received guide message through a sound output unit (e.g., speaker).

The AI speaker 400C may receive a response of the user (U) to the guide message. In an embodiment, the AI speaker 400C may receive the response of the user (U) through a microphone included in the AI speaker 400C. The response of the user (U) means a voice response including a command or a voice response including a command and a wake-up word.

The response of the user (U) may be a positive or negative response to a new control operation. The AI cooking device 300 may perform or not perform a next new control operation based on the received positive or negative response.

The AI cooking device 300 may perform natural language processing through the processor. The natural language processing may analyze a text to analyze the intent or extract the entity name. If the AI cooking device 300 receives a text message of the user (U), the AI cooking device 300 may apply the received text message to a natural language engine and extract one cooking step included in the text message. The AI cooking device 300 may perform a subsequent control operation based on the extracted one cooking step.

The present disclosure described above may be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

The invention claimed is:

1. A method of controlling an intelligent cooking device by a processor, the method comprising:
 receiving sensing information related to a cooking state of a content of a container during performing a first control operation according to a first control information;
 checking the cooking state of the content based on the sensing information;
 generating, based on the cooking state of the content and a usage history of a user, a second control information for a second control operation to be performed after an end of the first control operation; and performing the second control operation according to the second control information, further comprising;

converting into a remote control mode in response to a change in a distance when a mobile terminal of the user is spaced apart from the intelligent cooking device by a preset reference value or more, even if there is no remote control request.

2. The method of claim 1, wherein the container is disposed on a heating area of the intelligent cooking device, and wherein the content is an ingredient that is an object of cooking.

3. The method of claim 1, wherein the cooking state includes at least one of a temperature of the content, a temperature of the container, a boiling state or a non-boiling state of the content.

4. The method of claim 1, wherein the second control information includes a scheduled heating temperature or a scheduled heating time.

5. The method of claim 1, further comprising:

generating a cooking order of a recipe format including the first and the second control information related to the first and the second control operations.

6. The method of claim 1, wherein the performing of the second control operation comprises:

transmitting a guide message including the second control information to a terminal; and determining the performing of the second control operation based on a response received from the terminal.

7. The method of claim 6, wherein the terminal includes an intelligent speaker, the mobile terminal, or a television (TV).

8. The method of claim 7, further comprising:

transmitting a message for checking an activation state of the terminal, and transmitting the guide message when the terminal is in the activation state.

9. The method of claim 8, wherein the terminal is the intelligent speaker, and a state of the intelligent speaker is in the activation state when an audio signal related to a movement of the user is received by the intelligent speaker.

10. The method of claim 8, wherein the terminal is the TV, and a state of the TV is in the activation state when a power of the TV is turned on.

11. The method of claim 1, further comprising:

identifying the user based on biometric information of the user; and loading the usage history corresponding to identification information of the user.

12. The method of claim 11, wherein the biometric information includes at least one of a voiceprint, a fingerprint, or a face.

13. The method of claim 1, wherein the generating of the second control information comprises:

applying the cooking state, the first control information related to the first control operation, or the usage history to a pre-trained learning model; and generating the second control information for the second control operation from an output of the pre-trained learning model.

14. The method of claim 13, wherein the pre-trained learning model is a neural network model in which learning is performed by setting the cooking state, the first control information related to the first control operation, or the usage history as an input, and setting candidates of the second control information for the second control operation as an output.

15. The method of claim 1, wherein the usage history is stored to match at least one of user information or a recipe.

16. The method of claim 1, further comprising:

receiving a control message from the mobile terminal; and performing the second control operation in response to the control message.

17. The method of claim 16, further comprising:

establishing a communication connection with the terminal, wherein the communication connection is a wireless connection using one of WI-FI, a cellular network, or new radio (NR).

18. An intelligent cooking device comprising:

at least one sensor configured to obtain sensing information related to a cooking state of a content of a container when a first control operation according to a first control information is performed;

a processor configured to check the cooking state of the content based on the sensing information and generate, based on the cooking state of the content and a usage history of a user, second control information for a second control operation to be performed after an end of the first control operation, and perform the second control operation according to the second control information, wherein the processor is further configured to convert into a remote control mode in response to a change in a distance when a mobile terminal of the user is spaced apart from the intelligent cooking device by a preset reference value or more, even if there is no remote control request.

19. A non-transitory processor readable medium storing a program, which when executed by a processor, causes the processor to perform a method, comprising:

receiving sensing information related to a cooking state of a content of a container during performing a first control operation according to a first control information;

checking the cooking state of the content based on the sensing information;

generating, based on the cooking state of the content and a usage history of a user, a second control information for a second control operation to be performed after an end of the first control operation; and performing the second control operation according to the second control information, further comprising;

converting into a remote control mode in response to a change in a distance when a mobile terminal of the user is spaced apart from the intelligent cooking device by a preset reference value or more, even if there is no remote control request.

* * * * *